US007809499B2

(12) United States Patent
Maekawa et al.

(10) Patent No.: US 7,809,499 B2
(45) **Date of Patent: *Oct. 5, 2010**

(54) SYSTEM, NAVIGATION METHOD, MEDIUM, AND INFORMATION SET

(75) Inventors: Hidetsugu Maekawa, Nara (JP); Yoshifumi Hirose, Nara (JP); Shinichi Yoshizawa, Osaka (JP); Kenji Mizutani, Nara (JP); Yumi Wakita, Nara (JP)

(73) Assignee: Panasonic Corporation, Osaka (JP)

( * ) Notice: Subject to any disclaimer, the term of this patent is extended or adjusted under 35 U.S.C. 154(b) by 824 days.

This patent is subject to a terminal disclaimer.

(21) Appl. No.: 11/734,963

(22) Filed: Apr. 13, 2007

(65) Prior Publication Data

US 2010/0030461 A1 Feb. 4, 2010

Related U.S. Application Data

(63) Continuation of application No. 10/415,842, filed on Sep. 22, 2003, now Pat. No. 7,251,559.

(51) Int. Cl.
*G01C 21/00* (2006.01)

(52) U.S. Cl. ........................ 701/201; 701/200; 701/211; 701/212; 340/995.18; 705/14.4

(58) Field of Classification Search ................... 701/35, 701/200, 201, 211, 212; 340/990, 992, 995.18; 73/178 R; 705/14.4
See application file for complete search history.

(56) References Cited

U.S. PATENT DOCUMENTS 5,184,303 A 2/1993 Link
5,627,549 A 5/1997 Park (Continued)

FOREIGN PATENT DOCUMENTS

EP 0713 335 5/1996

(Continued)

OTHER PUBLICATIONS

Supplementary European Search Report for PCT/JP0109751, Oct. 12, 2009.

(Continued)

*Primary Examiner*—Gertrude Arthur Jeanglaud
(74) *Attorney, Agent, or Firm*—RatnerPrestia

(57) ABSTRACT

When traveling to a destination reported in a television broadcast or the like, the user has had to make a memo while watching the television and, when actually traveling by car, the user has had to enter necessary information into an in-vehicle terminal by looking at the memo. A broadcast provider broadcasts a travel program together with travel destination information related to it, and a television terminal presents the received broadcast and travel destination information to the user. If the user desires to travel to the destination thus presented, the television terminal downloads the received travel destination information into a memory card. When the user goes out by car at a later date, the in-vehicle information terminal acquires the travel destination information from the memory card, a route setting section sets the route by using travel destination location information contained in the travel destination information, and a communication section acquires real-time information by using a method of connection to a real-time information having the travel destination information.

18 Claims, 15 Drawing Sheets

U.S. PATENT DOCUMENTS

| | | | | |
|---|---|---|---|---|
| 5,941,933 | A | 8/1999 | Miyake et al. | |
| 6,012,012 | A | 1/2000 | Fleck et al. | |
| 6,522,875 | B1 | 2/2003 | Dowling et al. | |
| 7,251,559 | B2 * | 7/2007 | Maekawa et al. | 701/200 |
| 2002/0027512 | A1 | 3/2002 | Horita et al. | |
| 2002/0046084 | A1 | 4/2002 | Steele et al. | |
| 2002/0049527 | A1 | 4/2002 | Kohno et al. | |
| 2002/0171581 | A1 | 11/2002 | Sheynblat et al. | |
| 2002/0188944 | A1 | 12/2002 | Noble | |
| 2003/0159150 | A1 | 8/2003 | Chernock et al. | |
| 2004/0088739 | A1 | 5/2004 | Shimoji et al. | |

FOREIGN PATENT DOCUMENTS

| | | |
|---|---|---|
| EP | 1003017 | 5/2000 |
| EP | 1 229 305 | 7/2002 |
| JP | 08-138193 | 5/1996 |
| JP | 08-293827 | 11/1996 |
| JP | 10-112829 | 4/1998 |
| JP | 10-164529 | 6/1998 |
| JP | 10-224291 | 8/1998 |
| JP | 08-289042 | 11/1998 |
| JP | 11-017633 | 1/1999 |
| JP | 11-098566 | 4/1999 |
| JP | 11-337353 | 12/1999 |
| JP | 2000-215211 | 8/2000 |
| JP | 2000-222534 | 8/2000 |
| JP | 2000-268090 | 9/2000 |

OTHER PUBLICATIONS

Japanese Office Action with dispatch date of Jul. 15, 2003 (2001-342338).

Japanese Office Action with dispatch date of Jul. 15, 2003 (2003-128727).

* cited by examiner

Fig. 2

EXAMPLE OF DATA BROADCAST SCRIPT

```
<naviprogram>
  <tvurl> http://www.nnn.com/...                           </tvurl>
  <displaydata>
    <title>  FAST BURGER (IKOMA SHOP)                       </title>
    <information>
      <address> NARA-KEN, IKOMA-SHI, . . .                  </address>
      <tel> 0774-77-7777                                    </tel>
      <fax> 0774-77-7778                                    </fax>
      <url> http://www.fastburger.com/...                   </url>
      <email> cs@fastburger.com                             </email>
      <opentime> 7:00~23:00                                 </opentime>
      <holiday> OPEN YEAR ROUND                             </holiday>
    </information>
    <comment>
      <subcomment> SERVICE SET A OFFERED AT HALF            </subcomment>
                   PRICE FOR LIMITED PERIOD
      <subcomment> UNTIL SEPTEMBER 30!                      </subcomment>
    </comment>
  </displaydata>
  <navidata>
    ...
  </navidata>
</naviprogram>
```

Fig. 4 EXAMPLE OF DATA SCRIPT TO BE SET INTO IN-VEHICLE INFORMATION TERMINAL

```
<navidata>
  <title>SERVICE SET A OFFERED AT HALF PRICE FOR
         LIMITED PERIOD ( FAST BURGER)                    </title>
  <url> http://www.fastburger.com/...        </url>
  <point>
    <latitude> N35.11.11.111                 </latitude>
    <longitude> E135.33.33.333               </longitude>
  </point>
  <information>
    <restaurant>
      <name> FAST BURGER(IKOMA SHOP)</name>
      <address>NARA-KEN,IKOMA-SHI,... </address>
      <tel> 0743-77-7777                     </tel>
      <email> cs@fastburger.com              </email>
      <opentime> 7:00~23:00                  </opentime>
      <holiday> OPEN YEAR ROUND              </holiday>
      <menu>
        <submenu>
          <name> SET A                       </name>
          <price> 200 YEN                    </price>
          <photo> "aset.jpg"                 </photo>
          <comment>OFFERED AT HALF PRICE
                   UNTIL SEPTEMBER 30!</comment>
        </submenu>
        <submenu>
          <name> SET B                       </name>
          <price> 450 YEN                    </price>
          <photo> "bset.jpg"                 </photo>
        </submenu>
        <submenu>
              ...
        </submenu>
      </menu>
    </restaurant>
  </information>
</navidata>
```

EXAMPLE OF INITIAL SCREEN DISPLAY OF IN-VEHICLE INFORMATION TERMINAL

DISPLAY EXAMPLE OF TRAVEL DESTINATION INFORMATION LIST HELD IN MEMORY CARD

EXAMPLE OF ORDER CONFIRMATION SCREEN

PLEASE CONFIRM YOUR ORDER

| MENU  | BEVERAGES | QUANTITY | PRICE   |
|-------|-----------|----------|---------|
| SET A | COKE      | 2        | 400 YEN |
| SET A | JUICE     | 1        | 200 YEN |
| SET B | COFFEE    | 1        | 450 YEN |

TOTAL 1,050 YEN

NEXT PAGE

BACK

ORDER
1001

Fig. 11

EXAMPLE OF DATA SCRIPT FOR REAL-TIME INFORMATION

```
<realtimenavidata>
  <updatetime>2000/9/23 10:15                         </updatetime>
  <information>
    <restaurant>
      <name>WELCOME TO  FAST  BURGER IKOMA SHOP!! </name>
      <situation>
        <photo>"shopinside.jpg"        </photo>
        <comment>
         <subcomment>SERVICE SET A AT HALF PRICE! SELLING WELL! </subcomment>
         <subcomment>ABOUT 30 SEATS ARE EMPTY AT THE MOMENT     </subcomment>
        </comment>
      </situation>
      <order>
       ...
      </order>
    </restaurant>
  </information>
</realtimenavidata>
```

Fig. 12

EXAMPLE OF DATA SCRIPT FOR ORDER INFORMATION

```
<order>
  <menu>
    <submenu>
      <name> SET -A              </name>
      <price> 200 YEN            </price>
      <photo> "aset.jpg"         </photo>
      <amount> 0                 </amount>
      <option>
        <type> BEVERAGES         </type>
        <menu>
          <submenu>
            <name> COKE          </name>
            <price> 0 YEN        </price>
            <amount> 0           </amount>
          </submenu>
          <submenu>
            <name> COFFEE        </name>
            <price> 0 YEN        </price>
            <amount> 0           </amount>
          </submenu>
          <submenu>
            <name> JUICE         </name>
            <price> 0 YEN        </price>
            <amount> 0           </amount>
          </submenu>
          <submenu>
            <name> WULONG TEA    </name>
            <price> 0 YEN        </price>
            <amount> 0           </amount>
          </submenu>
          <submenu>
              ...
          </submenu>
        </menu>
      </option>
    </submenu>
    <submenu>
      <name> SET B               </name>
      <price> 450 YEN            </price>
      <photo> "bset.jpg"         </photo>
      <option>
          ...
      </option>
    </submenu>
  </menu>
</order>
```

SYSTEM, NAVIGATION METHOD, MEDIUM, AND INFORMATION SET

This is a continuation application based on application Ser. No. 10/415,842, filed Sep. 22, 2003, which is a U.S. National Phase Application of PCT International Application PCT/JP01/09751 which is hereby incorporated by reference.

TECHNICAL FIELD

The present invention relates to a travel destination information system that produces a navigation display when the user travels by car, for example, when going out for a trip or to dine at a restaurant, and also relates to a system, a navigation method, a medium, and a program.

BACKGROUND ART

In recent years, BS digital broadcasting using broadcasting satellites has been entering commercial service. In digital broadcasting, not only is program video transmitted, but tagged information is also broadcasted which is called data broadcasting. This information includes, for example, real-time information such as news and weather forecasts, detailed information related to program content and advertised merchandise, and the URLs of their related Internet home pages. Furthermore, by connecting a television terminal to the broadcaster via a telephone line, the user can respond to a quiz program, can participate in an opinion poll conducted in a program, or can transmit real-time information on which program or which advertisement the user is watching.

A technology for transmitting the URLs of Internet home pages to television terminals in such data broadcasting is disclosed, for example, in Japanese Unexamined Patent Publication No. H10-164529. This prior art technology enables the television terminal to connect to the Internet by using the URL transmitted via digital broadcasting and to bring the desired home page onto the display for viewing. Furthermore, information related to the travel spot currently being broadcast on television or radio, such as a spa, a theme park, or a restaurant that offers good-tasting food, can also be broadcast as a data broadcast together with video, and further detailed information. The detailed information may include the travel destination, reservation status, etc., which can be obtained by using the URL provided by the data broadcast.

On the other hand, a technology for providing various pieces of travel destination information (route guidance, sightseeing information, etc.) to in-vehicle information terminals via the Internet is disclosed in Japanese Unexamined Patent Publication No. 2000-215211. According to this prior art technology, travel destination information is described in XML (eXtensible Markup Language), an Internet description language, to perform various kinds of control such as the generation of a display and voice guidance on the in-vehicle information terminal.

However, with the above prior art technologies, data received by a television terminal can only be used on that television terminal. That is, the home page offering the various kinds of travel destination information, which is specified by the URL received by the television terminal via data broadcasting, can only be accessed from that television terminal. As a result, when the user travels by car at a later date to the place reported in the broadcast, the user has to go through the following procedure if he wants to set the destination into the in-vehicle information terminal or to access the home page offering the travel destination information from the in-vehicle information terminal.

First, the user jots down the address, telephone number, map, URL, etc. of a travel destination broadcasted in the program on memo paper. Then, when traveling by car at a later date, the user, while looking at the handwritten memo, sets the destination into the in-vehicle information terminal or enters the URL of the travel destination information and accesses the home page providing real-time information. In this way, the user has had to go through the cumbersome procedure of entering the necessary information into the in-vehicle information terminal by looking at the handwritten memo. Furthermore, there has been the problem that the user may fail to enter the destination information correctly, for example, because he had jotted down the wrong information or, if the memo is lost, the user has to rely on vague memory and, in the worst case, has to abandon the plan to drive to that place.

In this way, when actually traveling by car, if the user wants to use navigational information such as the travel destination information obtained from a broadcast program, the user has to go to the trouble of manually re-entering the navigational information.

Furthermore, when actually traveling by car, if the user wants to use navigational information such as the travel destination information obtained from a broadcast program, there is the possibility that since the necessary information has to be re-entered manually, the navigational information may be entered incorrectly, or the navigational information itself may be lost.

DISCLOSURE OF THE INVENTION

In view of the above problems, it is an object of the present invention to provide a system that enables the user to use the navigational information obtained from a broadcast program, without having go to the trouble of re-entering it manually when the user actually goes out by car; it is also an object of the invention to provide a navigation method, a medium, and a program.

Further, in view of the above problems, it is an object of the present invention to provide a system that enables the user to use the navigational information obtained from a broadcast program, without having to re-enter it manually when the user actually goes out by car, and thus prevents the navigational information from being entered incorrectly or lost; it is also an object of the invention to provide a navigation method, a medium, and a program.

To solve the above problems, a first aspect of the present invention is a system comprising:

a first system which broadcasts navigational information in relation to a program and/or an advertisement, in addition to the program and/or the advertisement;

a second system which receives said broadcast and transfers said navigational information contained in said received broadcast to a portable memory means for storing therein; and a third system which produces a navigation display by acquiring said navigational information stored in said portable memory means.

A second aspect of the present invention is a system which uses portable information processing means that stores at least navigational information in an information storing means and acquires at least said navigational information from said information storing means, said system comprising:

a first system which broadcasts navigational information in relation to a program and/or an advertisement, in addition to the program and/or the advertisement;

a second system which receives said broadcast and outputs said navigational information contained in said received broadcast to said portable information processing means; and a third system which produces a navigation display by acquiring via said portable information processing means said navigational information that said portable information processing means stored in said information storing means.

A third aspect of the present invention is a system which uses a portable information processing means that can store at least navigational information in an information storing means and can output an address of said information storing means, said system comprising:

a first system which broadcasts navigational information in relation to a program and/or an advertisement, in addition to the program and/or the advertisement;

a second system which receives said broadcast and outputs said navigational information contained in said received broadcast to said portable information processing means; and a third system which acquires the address of said information storing means from said portable information processing means, and produces a navigation display by acquiring said navigational information by accessing said information storing means based on said address.

A fourth aspect of the present invention is a system comprising:

a first system which broadcasts navigational information in relation to a program and/or an advertisement, in addition to the program and/or the advertisement;

a second system which receives said broadcast and presents said program and/or said advertisement to a user, and which, in response to a request from said user, requests said first system to download said navigational information related to said program and/or said advertisement into an information storing means; and a third system which produces a navigation display by acquiring said navigational information that said first system downloaded into said information storing means in response to the request from said second system.

A fifth aspect of the present invention is a first system which broadcasts navigational information in relation to a program and/or an advertisement, in addition to the program and/or the advertisement.

A sixth aspect of the present invention is a first system as described in the fifth aspect of the present invention, comprising an information storing means, which holds at least either a first ID for identifying a second system that receives a broadcast or a second ID for identifying a third system that displays navigation information; and said navigational information requested by a user.

A seventh aspect of the present invention is a first system as described in the fifth aspect of the present invention, wherein said first system comprises a means of having an external information storing means hold therein: at least either a first ID for identifying a second system that receives a broadcast or a second ID for identifying a third system that displays navigation information; and said navigational information requested by a user.

An eighth aspect of the present invention is a first system as described in the fifth aspect of the present invention, comprising an information storing means, which holds:

information for associating a first ID for identifying a second system that receives a broadcast with a second ID for identifying a third system that displays navigation information;

said second ID obtained from said associating information as corresponding to said first ID reported from a user; and said navigational information requested by said user.

A ninth aspect of the present invention is a first system as described in the fifth aspect of the present invention, wherein said first system comprises a means of having an external information storing means hold therein:

information for associating a first ID for identifying a second system that receives a broadcast with a second ID for identifying a third system that displays navigation information;

said second ID obtained from said associating information as corresponding to said first ID reported from a user; and said navigational information requested by said user.

A tenth aspect of the present invention is a first system as described in the fifth aspect of the present invention, wherein said first system comprises a means of having an external information storing means hold therein:

information for associating a first ID for identifying a second system that receives a broadcast with a second ID for identifying a third system that displays navigation information;

said first ID obtained from said associating information as corresponding to said second ID reported from a user; and said navigational information requested by said user.

A twelfth aspect of the present invention is a second system comprising a means of receiving a broadcast from a first system broadcasting navigational information in relation to a program and/or an advertisement, in addition to the program and/or the advertisement, and of having a portable memory means store therein said navigational information contained in said received broadcast.

A thirteenth aspect of the present invention is a second system comprising a means of receiving a broadcast from a first system broadcasting navigational information in relation to a program and/or an advertisement, in addition to the program and/or the advertisement, and of outputting said navigational information contained in said received broadcast to a portable information processing means.

A fourteenth aspect of the present invention is a second system comprising a means of receiving a broadcast from a first system broadcasting navigational information in relation to a program and/or an advertisement, in addition to the program and/or the advertisement, and of presenting said program and/or said advertisement to a user and, in response to a request from said user, transferring said navigational information related to said program and/or said advertisement to a portable memory means for storing therein.

A fifteenth aspect of the present invention is a second system comprising a means of receiving a broadcast from a first system broadcasting navigational information in relation to a program and/or an advertisement, in addition to the program and/or the advertisement, and of presenting said program and/or said advertisement to a user and, in response to a request from said user, outputting said navigational information related to said program and/or said advertisement to a portable information processing means.

A sixteenth aspect of the present invention is a second system as described in any one of the twelfth to the fifteenth aspect of the present invention, wherein said first system includes an information storing means, and said second system comprises a means of requesting, in response to a request from a user, said first system to download said navigational information related to said program and/or said advertisement into said information storing means.

A seventeenth aspect of the present invention is a second system as described in any one of the twelfth to the fifteenth aspects of the present invention, comprising a means of requesting, in response to a request from a user, said first system to download said navigational information related to said program and/or said advertisement into an external information storing means.

An eighteenth aspect of the present invention is a second system as described in the sixteenth or the seventeenth aspect of the present invention, wherein said information storing means holds therein: at least either a first ID for identifying said second system that receives a broadcast or a second ID for identifying a third system that displays navigation information; and said navigational information requested by said user.

A nineteenth aspect of the present invention is a second system as described in the sixteenth or the seventeenth aspect of the present invention, wherein said information storing means holds therein:

information for associating a first ID for identifying said second system that receives a broadcast with a second ID for identifying a third system that displays navigation information;

said second ID obtained from said associating information as corresponding to said first ID reported from said user; and said navigational information requested by said user.

A twentieth aspect of the present invention is a second system as described in the sixteenth or the seventeenth aspect of the present invention, wherein said information storing means holds therein:

information for associating a first ID for identifying said second system that receives a broadcast with a second ID for identifying a third system that displays navigation information;

said first ID obtained from said associating information as corresponding to said second ID reported from said user; and said navigational information requested by said user.

A twenty-first aspect of the present invention is a third system comprising:

input means of acquiring navigational information in relation to a program and/or an advertisement stored in a portable storing means, and display means of producing a navigation display based on said navigational information acquired from said input means.

A twenty-second aspect of the present invention is a third system comprising:

input means of acquiring navigational information in relation to a program and/or an advertisement from a portable storing means in which said navigational information is stored, via a portable information processing means which acquires at least said navigational information, and display means of producing a navigation display based on said navigational information acquired from said input means.

A twenty-third aspect of the present invention is a third system comprising:

input means of acquiring an address of an information storing means in which navigational information in relation to a program and/or an advertisement is stored, from a portable information processing means where said address is held, and display means of producing a navigation display by acquiring said navigational information by accessing said information storing means based on said address acquired from said input means.

A twenty-fourth aspect of the present invention is a third system as described in the twenty-second or the twenty-third aspect of the present invention, wherein said information storing means holds therein: at least either a first ID for identifying a second system that receives a broadcast or a second ID for identifying said third system that displays navigation information; and said navigational information requested by a user.

A twenty-fifth aspect of the present invention is a third system as described in the twenty-second or the twenty-third aspect of the present invention, wherein said information storing means holds therein:

information for associating a first ID for identifying a second system that receives a broadcast with a second ID for identifying said third system that displays navigation information;

said second ID obtained from said associating information as corresponding to said first ID reported from a user; and said navigational information requested by said user.

A twenty-sixth aspect of the present invention is a third system as described in the twenty-second or the twenty-third aspect of the present invention, wherein said information storing means holds therein:

information for associating a first ID for identifying a second system that receives a broadcast with a second ID for identifying said third system that displays navigation information;

said first ID obtained from said associating information as corresponding to said second ID reported from a user; and said navigational information requested by said user.

A twenty-seventh aspect of the present invention is a system as described in any one of the first to the fourth, the sixth to the tenth, and the eighteenth to the twenty-sixth aspects of the present invention, wherein said navigational information acquired by said third system is one that can be handled by software that said third system possesses.

A twenty-eight aspect of the present invention is a system as described in any one of the first to the fourth, the sixth to the tenth, and the eighteenth to the twenty-sixth aspects of the present invention, wherein said navigational information contains prescribed geographical information, and said third system makes a setting for route guidance by using location information contained therein.

A twenty-ninth aspect of the present invention is a system as described in any one of the first to the fourth, the sixth to the tenth, and the eighteenth to the twenty-sixth aspects of the present invention, wherein said third system is an in-vehicle information terminal.

A thirtieth aspect of the present invention is a system as described in any one of the first to the fourth, the sixth to the tenth, and the eighteenth to the twenty-sixth aspects of the present invention, wherein said third system is a portable information terminal.

A thirty-first aspect of the present invention is a system as described in any one of the first to the fourth, the sixth to the tenth, and the eighteenth to the twenty-sixth aspects of the present invention, wherein said navigational information contains a prescribed Internet URL, and said third system makes access based on said prescribed URL.

A thirty-second aspect of the present invention is a system as described in any one of the first to the fourth, the sixth to the tenth, the twelfth to the twentieth, and the twenty-fourth to the twenty-sixth aspects of the present invention, wherein said second system includes a broadcast program storing means of storing said broadcasted program and/or advertisement and said navigational information, and said second system transfers said navigational information stored in said broadcast program storing means to said portable memory means for storing therein.

A thirty-third aspect of the present invention is a system as described in any one of the first to the fourth, the sixth to the tenth, the twelfth to the twentieth, and the twenty-fourth to the twenty-sixth aspects of the present invention, wherein said second system includes a communication means of reporting viewing status of the user of said second system, and when said navigational information is stored in said portable memory means by said second system, said communication means notifies said first system that said navigational information has been stored in said portable memory means.

A thirty-fourth aspect of the present invention is a system as described in any one of the first to the tenth and the twelfth to the seventeenth aspects of the present invention, wherein said first system uses satellite digital broadcasting.

A thirty-fifth aspect of the present invention is a system as described in any one of the first to the tenth and the twelfth to the seventeenth aspects of the present invention, wherein said first system uses cable television broadcasting and/or Internet television broadcasting.

A thirty-sixth aspect of the present invention is a system as described in any one of the first to the tenth and the twelfth to the seventeenth, wherein said navigational information that said first system broadcasts is written in an Internet description language.

A thirty-seventh aspect of the present invention is a system as described in any one of the first to the fourth, the sixth to the tenth, the sixth to the twentieth, and the twenty-second to the twenty-sixth aspects of the present invention, wherein said information storing means is constructed from a data base which is referred to via the Internet.

A thirty-eighth aspect of the present invention is a navigation method comprising:

a broadcasting step of broadcasting navigational information in relation to a program and/or an advertisement, in addition to the program and/or the advertisement;

a broadcast receiving step of receiving said broadcast and transferring said navigational information contained in said received broadcast to a portable memory means for storing therein; and an information receiving/transmitting step of producing a navigation display by acquiring said navigational information stored in said portable memory means.

A thirty-ninth aspect of the present invention is a navigation method which uses portable information processing means for storing at least navigational information in an information storing means and can acquire at least said navigational information from said information storing means, said method comprising:

a broadcasting step of broadcasting navigational information in relation to a program and/or an advertisement, in addition to the program and/or the advertisement;

a broadcast receiving step of receiving said broadcast and outputting said navigational information contained in said received broadcast to said portable information processing means; and an information receiving/transmitting step of producing a navigation display by acquiring via said portable information processing means said navigational information that said portable information processing means stored in said information storing means.

A fortieth aspect of the present invention is a navigation method which uses portable information processing means that stores at least navigational information in an information storing means and outputs an address of said information storing means, said method comprising:

a broadcasting step of broadcasting navigational information in relation to a program and/or an advertisement, in addition to the program and/or the advertisement;

a broadcast receiving step of receiving said broadcast and outputting said navigational information contained in said received broadcast to said portable information processing means; and an information receiving/transmitting step of acquiring the address of said information storing means from said portable information processing means, and producing a navigation display by acquiring said navigational information by accessing said information storing means based on said address.

A forty-first aspect of the present invention is a navigation method comprising:

a broadcasting step of broadcasting navigational information in relation to a program and/or an advertisement, in addition to the program and/or the advertisement;

a broadcast receiving step of receiving said broadcast and presenting said program and/or said advertisement to a user and, in response to a request from said user, requesting said broadcasting step to download said navigational information related to said program and/or said advertisement into an information storing means; and an information receiving/transmitting step of producing a navigation display by acquiring said navigational information that said broadcasting step downloaded into said information storing means in response to the request from said broadcast receiving step.

A forty-second aspect of the present invention is a computer processable medium holding thereon a program for causing a computer to function as all or part of the system described in the first aspect of the present invention, said system comprising:

the first system which broadcasts navigational information in relation to a program and/or an advertisement, in addition to the program and/or the advertisement;

the second system which receives said broadcast and transfers said navigational information contained in said received broadcast to said portable memory means for storing therein; and the third system which produces a navigation display by acquiring said navigational information stored in said portable memory means.

A forty-third aspect of the present invention is a computer processable medium holding thereon a program for causing a computer to function as all or part of the system described in the second aspect of the present invention, said system comprising:

the first system which broadcasts navigational information in relation to a program and/or an advertisement, in addition to the program and/or the advertisement;

the second system which receives said broadcast and outputs said navigational information contained in said received broadcast to said portable information processing means; and the third system which produces a navigation display by acquiring via said portable information processing means said navigational information that said portable information processing means stored in said information storing means.

A forty-fourth aspect of the present invention is a computer processable medium holding thereon a program for causing a computer to function as all or part of the system described in the third aspect of the present invention, said system comprising:

the first system which broadcasts navigational information in relation to a program and/or an advertisement, in addition to the program and/or the advertisement;

the second system which receives said broadcast and outputs said navigational information contained in said received broadcast to said portable information processing means; and the third system which acquires the address of said information storing means from said portable information processing means, and produces a navigation display by acquiring said navigational information by accessing said information storing means based on said address.

A forty-fifth aspect of the present invention is a computer processable medium holding thereon a program for causing a computer to function as all or part of the system described in the fourth aspect of the present invention, said system comprising:

the first system which broadcasts navigational information in relation to a program and/or an advertisement, in addition to the program and/or the advertisement;

the second system which receives said broadcast and presents said program and/or said advertisement to a user, and which, in response to a request from said user, requests said first system to download said navigational information related to said program and/or said advertisement into said information storing means; and the third system which produces a navigation display by acquiring said navigational information that said first system downloaded into said information storing means in response to the request from said second system.

A forty-sixth aspect of the present invention is a program for causing a computer to function as all or part of the system described in the first aspect of the present invention, said system comprising:

the first system which broadcasts navigational information in relation to a program and/or an advertisement, in addition to the program and/or the advertisement;

the second system which receives said broadcast and transfers said navigational information contained in said received broadcast to said portable memory means for storing therein; and the third system which produces a navigation display by acquiring said navigational information stored in said portable memory means.

A forty-seventh aspect of the present invention is a program for causing a computer to function as all or part of the system described in the second aspect of the present invention, said system comprising:

the first system which broadcasts navigational information in relation to a program and/or an advertisement, in addition to the program and/or the advertisement;

the second system which receives said broadcast and outputs said navigational information contained in said received broadcast to said portable information processing means; and the third system which produces a navigation display by acquiring via said portable information processing means said navigational information that said portable information processing means stored in said information storing means.

A forty-eighth aspect of the present invention is a program for causing a computer to function as all or part of the system described in the third aspect of the present invention, said system comprising:

the first system which broadcasts navigational information in relation to a program and/or an advertisement, in addition to the program and/or the advertisement;

the second system which receives said broadcast and outputs said navigational information contained in said received broadcast to said portable information processing means; and the third system which acquires the address of said information storing means from said portable information processing means, and produces a navigation display by acquiring said navigational information by accessing said information storing means based on said address.

A forty-ninth aspect of the present invention is a program for causing a computer to function as all or part of the system described in the fourth aspect of the present invention, said system comprising:

the first system which broadcasts navigational information in relation to a program and/or an advertisement, in addition to the program and/or the advertisement;

the second system which receives said broadcast and presents said program and/or said advertisement to a user, and which, in response to a request from said user, requests said first system to download said navigational information related to said program and/or said advertisement into said information storing means; and the third system which produces a navigation display by acquiring said navigational information that said first system downloaded into said information storing means in response to the request from said second system.

A fiftieth aspect of the present invention is a system as described in any one of the first to the fourth, the sixth to the tenth, the sixteenth to the twentieth, and the twenty-second to the twenty-sixth aspects of the present invention, wherein said information storing means is constructed from a data base which is referred to via a short-range wireless communication means.

A fifty-first aspect of the present invention is a travel destination information setting system comprising:

a broadcasting system which broadcasts navigational information in addition to a program and/or an advertisement;

a receiving apparatus which receives said broadcast and transfers said navigational information contained in said received broadcast to a portable memory means for storing therein; and an in-vehicle information terminal which produces a navigation display by acquiring said navigational information stored in said portable memory means.

A fifth-second aspect of the present invention is a travel destination information setting system which uses a portable information processing means that can store at least navigational information in an information storing means and can acquire at least said navigational information from said information storing means, said system comprising:

a broadcasting system which broadcasts navigational information in addition to a program and/or an advertisement;

a receiving apparatus which receives said broadcast and outputs said navigational information contained in said received broadcast to said portable information processing means; and an in-vehicle information terminal which produces a navigation display by acquiring via said portable information processing means said navigational information that said portable information processing means stored in said information storing means.

A fifty-third aspect of the present invention is a travel destination information setting system which uses a portable information processing means that can store at least navigational information in an information storing means and can output an address of said information storing means, said system comprising:

a broadcasting system which broadcasts navigational information in addition to a program and/or an advertisement;

a receiving apparatus which receives said broadcast and outputs said navigational information contained in said received broadcast to said portable information processing means; and an in-vehicle information terminal which acquires the address of said information storing means from said portable information processing means, and produces a navigation display by acquiring said navigational information by accessing said information storing means based on said address.

A fifty-fourth aspect of the present invention is a travel destination information setting system comprising:

a broadcasting system which broadcasts navigational information in addition to a program and/or an advertisement;

a receiving apparatus which receives said broadcast and presents said program and/or said advertisement to a user, and which, in response to a request from said user, requests said broadcasting system to download said navigational information related to said program and/or said advertisement into an information storing means; and an in-vehicle information terminal which produces a navigation display by acquiring said navigational information that said broadcasting system downloaded into said information storing means in response to the request from said receiving apparatus.

For example, a travel destination information setting system as one example of the present invention comprises: a program broadcasting means of broadcasting, in addition to a travel destination program and an advertisement, information concerning the travel destination; a broadcast receiving means of receiving the program, advertisement, and travel destination information broadcasted by the program broadcasting means, and of presenting the received broadcast to a user; a portable memory means of downloading, at the user's request, the travel destination information received by the broadcast receiving means; an information receiving/transmitting means of acquiring the travel destination information downloaded into the portable memory means; and a real-time information providing means of providing real-time information concerning the travel destination, and wherein: the information receiving/transmitting means makes a route setting for route guidance by using travel destination location information contained in the travel destination information, and acquires the real-time information concerning the travel destination by using a method of connection to the real-time information providing means carried in the travel destination information.

Further, a travel destination information setting system as one example of the present invention comprises: a program broadcasting means of broadcasting, in addition to a travel destination program and an advertisement, information concerning the travel destination; a broadcast receiving means of receiving the program, advertisement, and travel destination information broadcasted by the program broadcasting means, and of presenting the received broadcast to a user; an information storing means of storing the travel destination information; a portable information processing means of holding therein a method of connection to the information storing means, and of performing control to download the travel destination information into the information storing means at the user's request; an information receiving/transmitting means of acquiring via the portable information processing means the travel destination information downloaded into the information storing means; and a real-time information providing means of providing real-time information concerning the travel destination, and wherein: the information receiving/transmitting means makes a route setting for route guidance by using travel destination location information contained in the travel destination information, and acquires the real-time information concerning the travel destination by using the method of connection to the real-time information providing means carried in the travel destination information.

Furthermore, a travel destination information setting system as one example of the present invention comprises: an information storing means of storing travel destination information; a program broadcasting means of broadcasting a travel destination program and an advertisement, and of performing control so as to download the travel destination information into the information storing means; a broadcast receiving means of receiving the program and advertisement broadcasted by the program broadcasting means, and of presenting the received broadcast to a user and, at the user's request, requesting the program broadcasting means to download the travel destination information related to the program or advertisement into the information storing means; and an information receiving/transmitting means of acquiring the travel destination information downloaded into the information storing means, and wherein: the information receiving/transmitting means makes a route setting for route guidance by using travel destination location information contained in the travel destination information, and acquires real-time information concerning the travel destination by using a method of connection to a real-time information providing means carried in the travel destination information.

In this way, according to the present invention, since the travel destination information is downloaded as electronic data, the travel destination information can be set into the in-vehicle information terminal without the user having to make a memo of the travel destination information broadcasted in a program. Further, since the invention includes information storing means, and the travel destination information is acquired by connecting to the information storing means, the travel destination information can be prevented from being lost somewhere.

BRIEF DESCRIPTION OF THE DRAWINGS

FIG. 2 is a diagram showing one example of a data broadcast script describing travel destination information according to the embodiment of the present invention.

FIG. 4 is a diagram showing one example of a travel destination data script to be set into an in-vehicle information terminal according to the embodiment of the present invention.

FIG. 11 is a diagram showing one example of a data script for displaying real-time information according to the embodiment of the present invention.

FIG. 12 is a diagram showing one example of a data script for displaying order information according to the embodiment of the present invention.

DESCRIPTION OF THE REFERENCE NUMERALS

101. BROADCAST PROVIDER
103. TRANSMITTING SECTION OF BROADCAST PROVIDER 101
104. TELEVISION TERMINAL
105. RECEIVING SECTION OF TELEVISION TERMINAL 104
107. CARD SLOT SECTION OF TELEVISION TERMINAL 104
113. MEMORY CARD
114. IN-VEHICLE INFORMATION TERMINAL
116. COMMUNICATION SECTION OF IN-VEHICLE INFORMATION TERMINAL 114
117. ROUTE SETTING SECTION OF IN-VEHICLE INFORMATION TERMINAL 114
118. CARD SLOT SECTION OF IN-VEHICLE INFORMATION TERMINAL 114
122. REAL-TIME INFORMATION PROVIDER
1301. INFORMATION STORING SECTION
1302. PORTABLE TERMINAL
1303. COMMUNICATION SECTION OF PORTABLE TERMINAL
1401. COMMUNICATION CONTROL SECTION OF BROADCAST PROVIDER
1402. TABLE SECTION OF BROADCAST PROVIDER
1403. TELEVISION TERMINAL ID STORING SECTION OF TELEVISION TERMINAL 104
1404. IN-VEHICLE INFORMATION TERMINAL ID STORING SECTION OF IN-VEHICLE INFORMATION TERMINAL 114

Best Mode For Carrying Out The Invention

Embodiments of the present invention will be described below with reference to the accompanying drawings.

Embodiment 1

First, a description will be given of a travel destination information setting system according to a first embodiment of the present invention.

Figure 1:
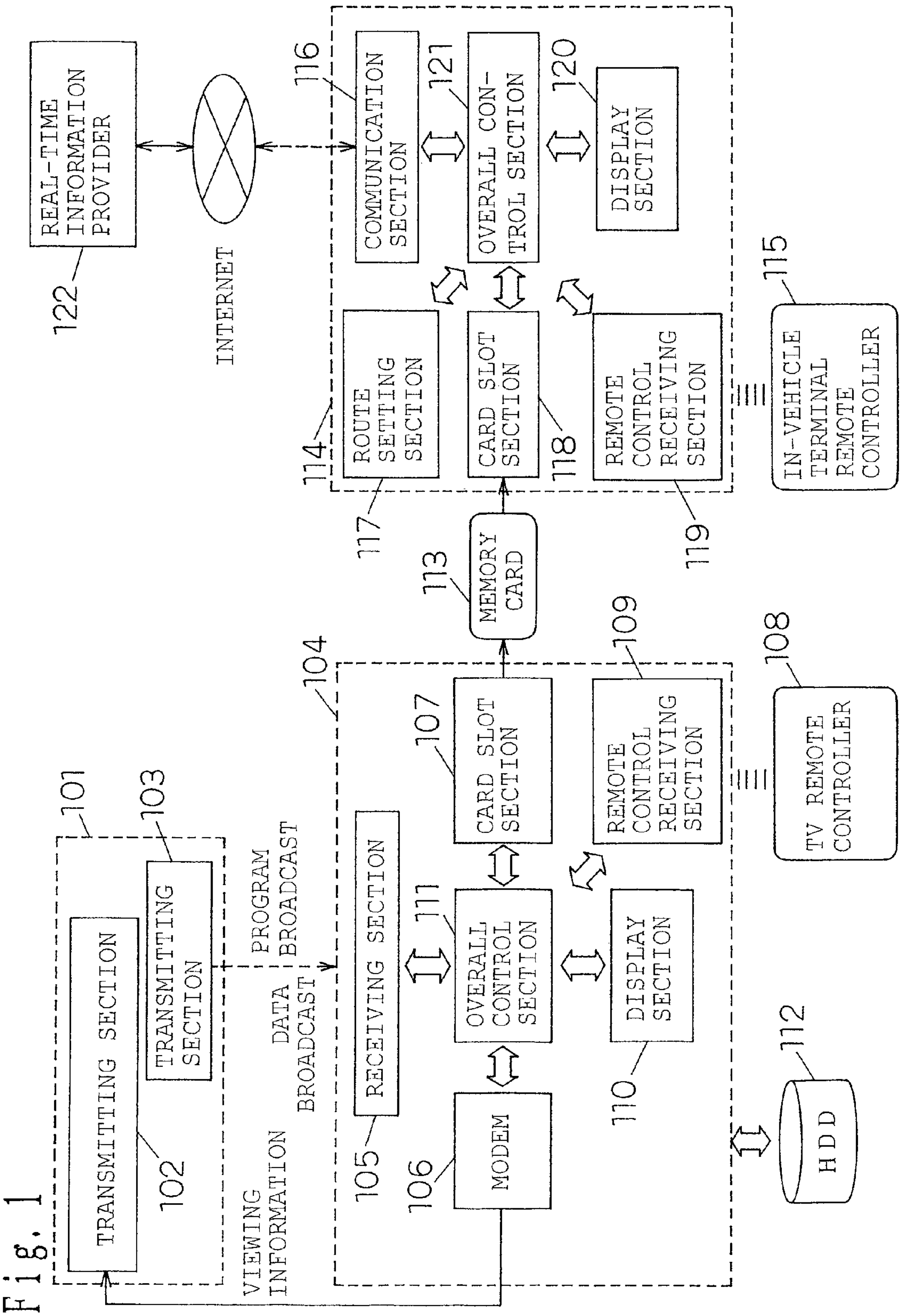
FIG. 1 is a diagram showing the configuration of a travel destination information setting system according to a first embodiment of the present invention.

FIG. 1 is a diagram showing the configuration of the travel destination information setting system according to the first embodiment of the present invention. In the figure, reference numeral 101 is a broadcast provider which broadcasts travel programs and travel-related advertisements, 102 is a viewer information acquiring section which acquires user's viewing status, and 103 is a transmitting section for transmitting programs and data broadcasts.

Further, in the figure, reference numeral 104 is a television terminal primarily designed for use in a home, 105 is a receiving section for receiving broadcasts, 106 is a modem for transmitting the user's viewing status to the broadcast provider 101 via a telephone line, 107 is a card slot section which controls data input and output to and from a memory card, 108 is a television remote controller for the user to operate the television terminal 104, 109 is a remote control receiving section for receiving signals from the television remote controller 108, 110 is a display section which displays television programs for viewing by the user, 111 is an overall control section which controls the overall operation of the television terminal 104, and 112 is an HDD for storing and recording program information.

Further, in the figure, reference numeral 113 is a memory card to which travel destination information acquired by the television terminal 104 is downloaded, 114 is an in-vehicle information terminal primarily designed for used in a vehicle and used for vehicle route guidance (car navigation) and for accessing the Internet, 115 is an in-vehicle terminal remote controller for the user to operate the in-vehicle information terminal 114, 116 is a communication section which controls access to the Internet, 117 is a route setting section which sets navigation information for the vehicle, 118 is a card slot section which controls data input and output to and from the memory card 113, 119 is a remote control receiving section for receiving signals from the in-vehicle terminal remote controller 115, 120 is a display section which presents information to the user, 121 is an overall control section which controls the overall operation of the in-vehicle information terminal 114, and 122 is a real-time information provider which provides real-time travel destination information to the in-vehicle information terminal 114 via the Internet.

In the figure, one broadcast provider 101 and one information service provider 122 are shown, but it will be appreciated that a plurality of such providers may be included.

FIG. 2 shows one example of a data broadcast script used when the broadcast provider 101 broadcasts a travel program or travel-related advertisement. In this embodiment, XML (eXtensible Markup Language), an Internet description language, is employed as the data broadcast format. In the data broadcast script of FIG. 2, characters enclosed by < >, such as <title> and <information>, are called tags, of which those that do not begin with </ are defined as starting tags, and those that begin with </ as ending tags. Between the starting and ending tags, another tag set can be nested, and information concerning each tag can be described. In XML, each tag defines an attribute, and the overall control sections in the television terminal 104 and the in-vehicle information terminal 114 respectively execute the processing operation defined by each tag by referring to a style sheet that is transmitted as a separate file. In the description of the embodiments of the present invention, the style sheet will not be shown, and only the processing operation of the system will be described. It will, however, be noted that the purpose here is to execute the desired processing operations, and the script description format is not limited to the illustrated one. The tags in the data broadcast script of FIG. 2 will be explained below.

a) Root tag

1)<naviprogram>

Indicates that the description carried here is a data broadcast which contains information that can be set into the in-vehicle information terminal.

A tag set of <tvurl>, <displaydata>, and <navidata> can be nested under this tag.

b) Tags under <naviprogram>

1)<tvurl>

Indicates the URL for transmitting the user's viewing status to the broadcast provider 101.

2)<displaydata>

Indicates data to be displayed on the television terminal. A tag set of <title>, <information>, and <comment> can be nested under this tag.

3)<navidata>

Indicates data to be set into the in-vehicle information terminal. Details will be described later with reference to FIG. 4.

c) Tags under <displaydata>

1)<title>

Indicates the title of the data to be displayed on the television terminal.

2)<information>

Indicates the travel destination information to be displayed on the television terminal. A tag set consisting at least of <address>, <tel>, <fax>, <url>, <email>, and <opentime> can be nested under this tag.

3)<comment>

Indicates the comment to be displayed on the television terminal.

d) Tags under <information>

1)<address>

Indicates address.

2)<tel>

Indicates telephone number.

3)<fax>

Indicates fax number.

4)<url>

Indicates home page address (URL).

4)<email>

Indicates e-mail address.

5)<opentime>

Indicates business hours.

6)<holiday>

Indicates regular holiday.

Figure 3:
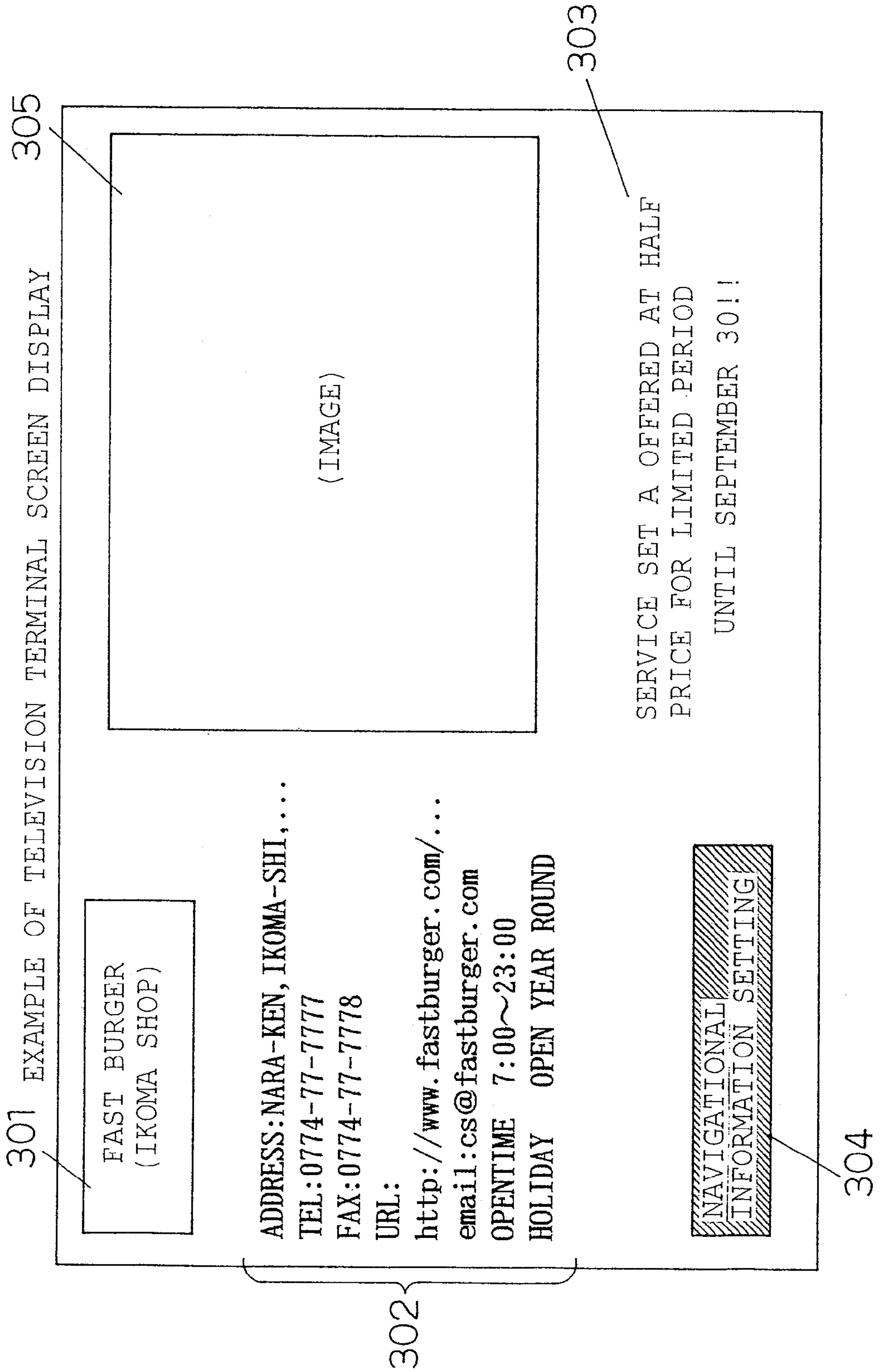
FIG. 3 is a diagram showing one example of a television terminal screen displaying a travel destination related program and travel destination information according to the embodiment of the present invention.

FIG. 3 shows an example of a screen produced when the data broadcast script shown in FIG. 2 is presented for display on the display section 110 of the television terminal 104.

FIG. 4 shows the script for <navidata> shown in FIG. 2, which defines the data to be set into the in-vehicle information terminal. In the first embodiment, this data is transferred from the television terminal 104 to the in-vehicle information terminal 114 via the memory card 113. The tags shown in FIG. 4 will be explained below.

a) Root tag

1)<navidata>

Indicates that the description carried here is the data to be set into the in-vehicle information terminal.

A tag set of <title>, <url>, <point>, and <information> can be nested under this tag.

2)<title>

Indicates the title used to refer to this script on the in-vehicle information terminal.

3)<url>

Indicates the URL used to access real-time information concerning the travel destination.

4)<point>

Indicates the location of the travel destination. A tag set of <latitude> and <longitude> can be nested under this tag.

5)<information>

Indicates the information to be displayed on the in-vehicle information terminal. A tag such as <restaurant> indicating the category of the travel destination information can be nested under this tag.

b) Tags under <point>

1)<latitude>

Indicates the latitude of the travel destination.

2)<longitude>

Indicates the longitude of the travel destination.

c) Tag under <information>

1)<restaurant>

Indicates that the information to be displayed on the in-vehicle information terminal is restaurant-related information. A tag set consisting as least of <name>, <address>, <tel>, <email>, <opentime>, <holiday>, and <menu> can be nested under this tag.

d) Tags under <restaurant>

1)<menu>

Indicates the menu that the restaurant offers. A tag set of <submenu> can be nested under this tag.

The tags <name>, <address>, <tel>, <email>, <opentime>, and <holiday> are the same as those described with reference to FIG. 2, and will not be described in detail here.

e) Tag under <menu>

1)<submenu>

Indicates individual menu items. Tags consisting at least of <name>, <price>, <photo>, and <comment> can be nested under this tag.

f) Tags under <submenu>

1)<name>

Indicates the name of the menu item.

2)<price>

Indicates the price of the menu item.

3)<photo>

Indicates the photo of the menu item.

4)<comment>

Indicates a comment concerning the menu item.

Figure 6:
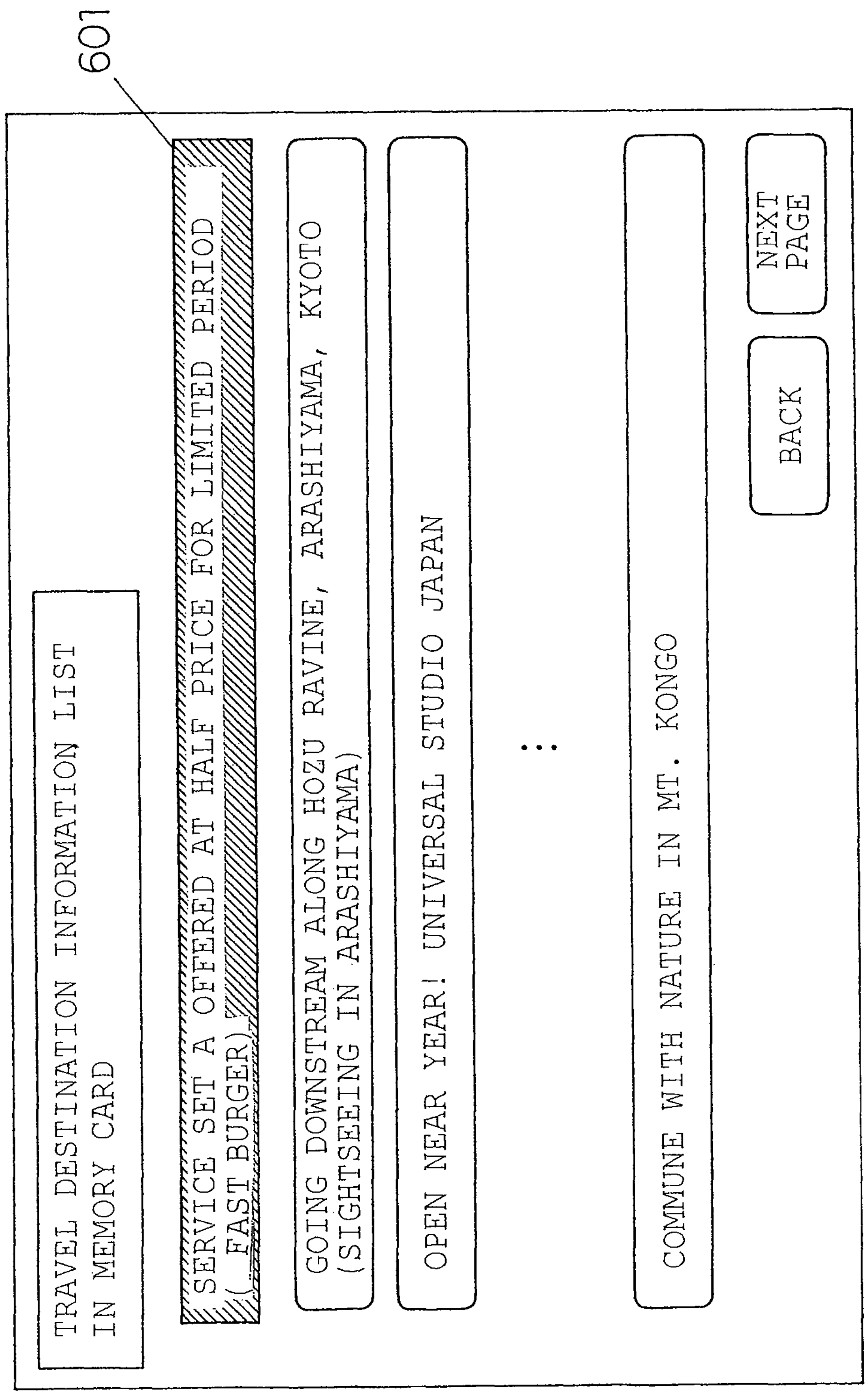
FIG. 6 is a diagram showing one example of a screen displaying a list of travel destination information stored on a memory card according to the embodiment of the present invention.
Figure 7:
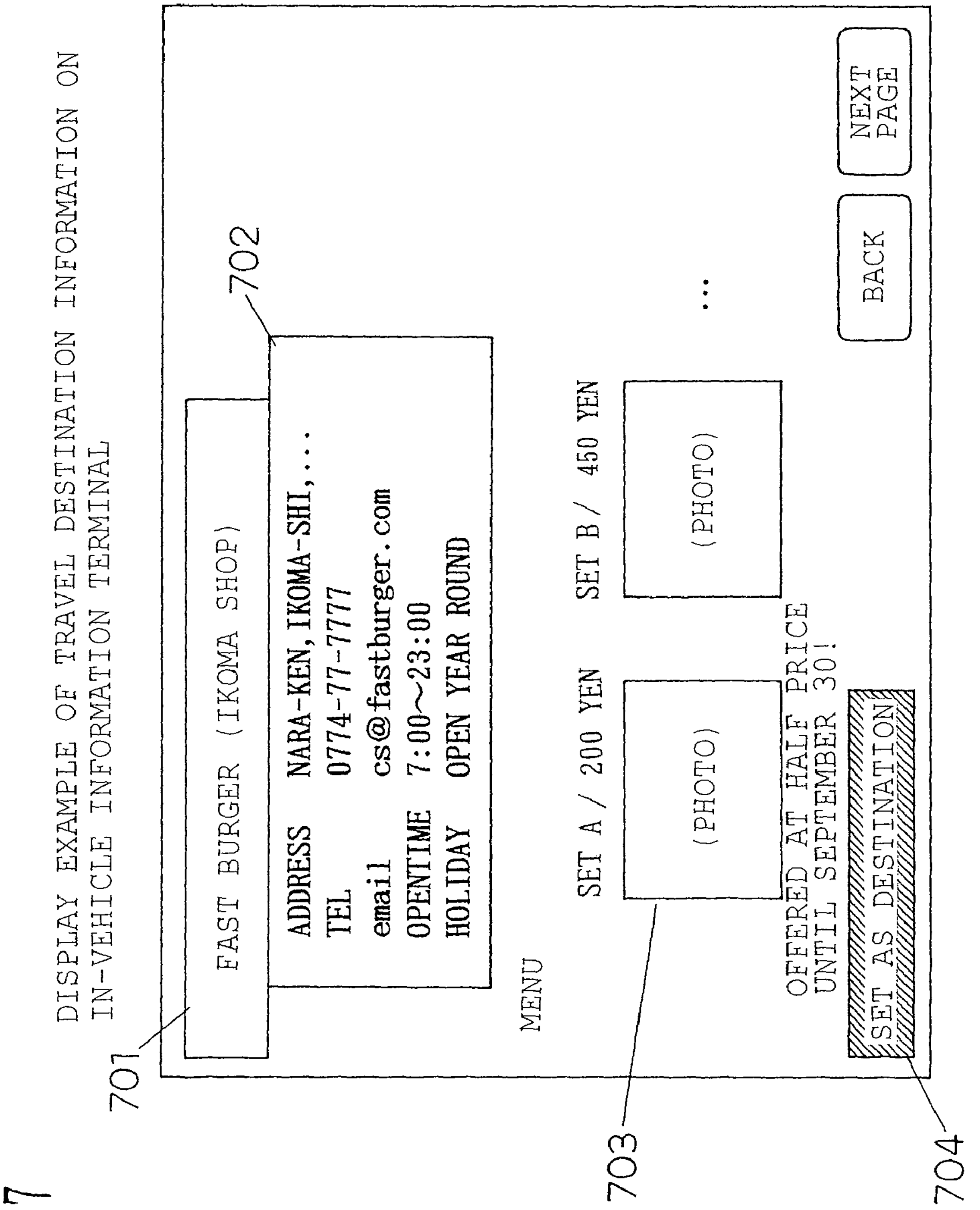
FIG. 7 is a diagram showing one example of the in-vehicle information terminal screen displaying the travel destination information according to the embodiment of the present invention.

FIGS. 6 and 7 each show an example of a screen produced when the data script of FIG. 4 set into the in-vehicle information terminal is presented for display on the display section 120 of the in-vehicle information terminal 114. FIG. 6 shows an example of a screen displaying a list of travel destination information downloaded to the memory card 113, and corresponds to <title> in FIG. 4. FIG. 7 shows a screen displaying the contents of <information> in FIG. 4; in this example, the contents are displayed in the format of restaurant information.

FIG. 11 shows one example of a data script used when the real-time information provider 122 in FIG. 1 sends real-time information to the in-vehicle information terminal 114. FIG. 12 shows one example of the detailed script for the <order> tag in FIG. 11. The tags in FIG. 11 will be explained below.

a) Root tag

1)<realtimenavidata>

Indicates that the description carried here is real-time information for in-vehicle information terminals. A tag set of <updatetime> and <information> can be nested under this tag.

b) Tags under <realtimenavidata>

1)<updatetime>

Indicates the last updated date and time of the real-time information.

2)<information>

Indicates the real-time information to be displayed on the in-vehicle information terminal. A tag set such as <restaurant> indicating the category of the travel destination information can be nested under this tag.

c) Tag under <information>

1)<restaurant>

Indicates that the information to be displayed on the in-vehicle information terminal is restaurant-related information. A tag set consisting at least of <name>, <situation>, and <order> can be nested under this tag.

d) Tags under <restaurant>

1)<situation>

Indicates the current situation. A tag set of <photo> and <comment> can be nested under this tag.

2)<order>

Indicates order information. Details will be described later with reference to FIG. 12.

Figure 8:
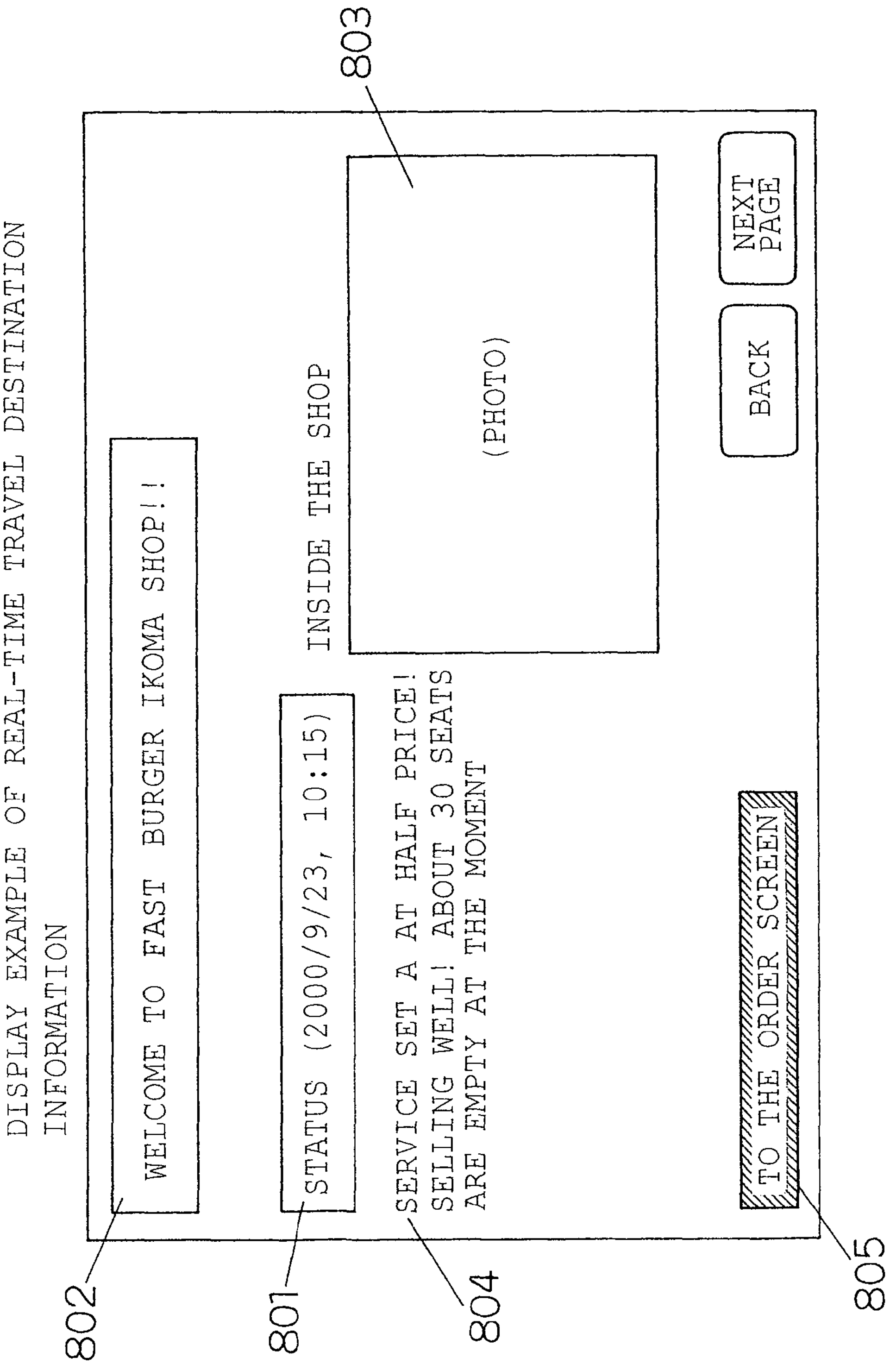
FIG. 8 is a diagram showing one example of a screen displaying real-time travel destination information according to the embodiment of the present invention.

The tags <name>, <photo>, and <comment> are the same as those described previously, and will not be described in detail here. FIG. 8 shows an example of a screen produced when the data script for the real-time information shown in FIG. 11 is presented for display on the display section 120 of the in-vehicle information terminal 114. The tags in FIG. 12 will be explained below.

a) Root tag

1)<order>

Indicates order information. A tag <menu> can be nested under this tag.

b) Tag under <order>

1)<menu>

Indicates menu items that can be ordered. A tag <submenu> can be nested under this tag.

c) Tags under <submenu>

1)<amount>

Indicates quantity. When the real-time information provider 122 sends the information, an initial value of 0 is set here, and when the user places an order, the value is set according to the quantity ordered.

2)<option>

Indicates menu options. A tag set consisting at least of <type> and <menu> can be nested under this tag.

Figure 9:
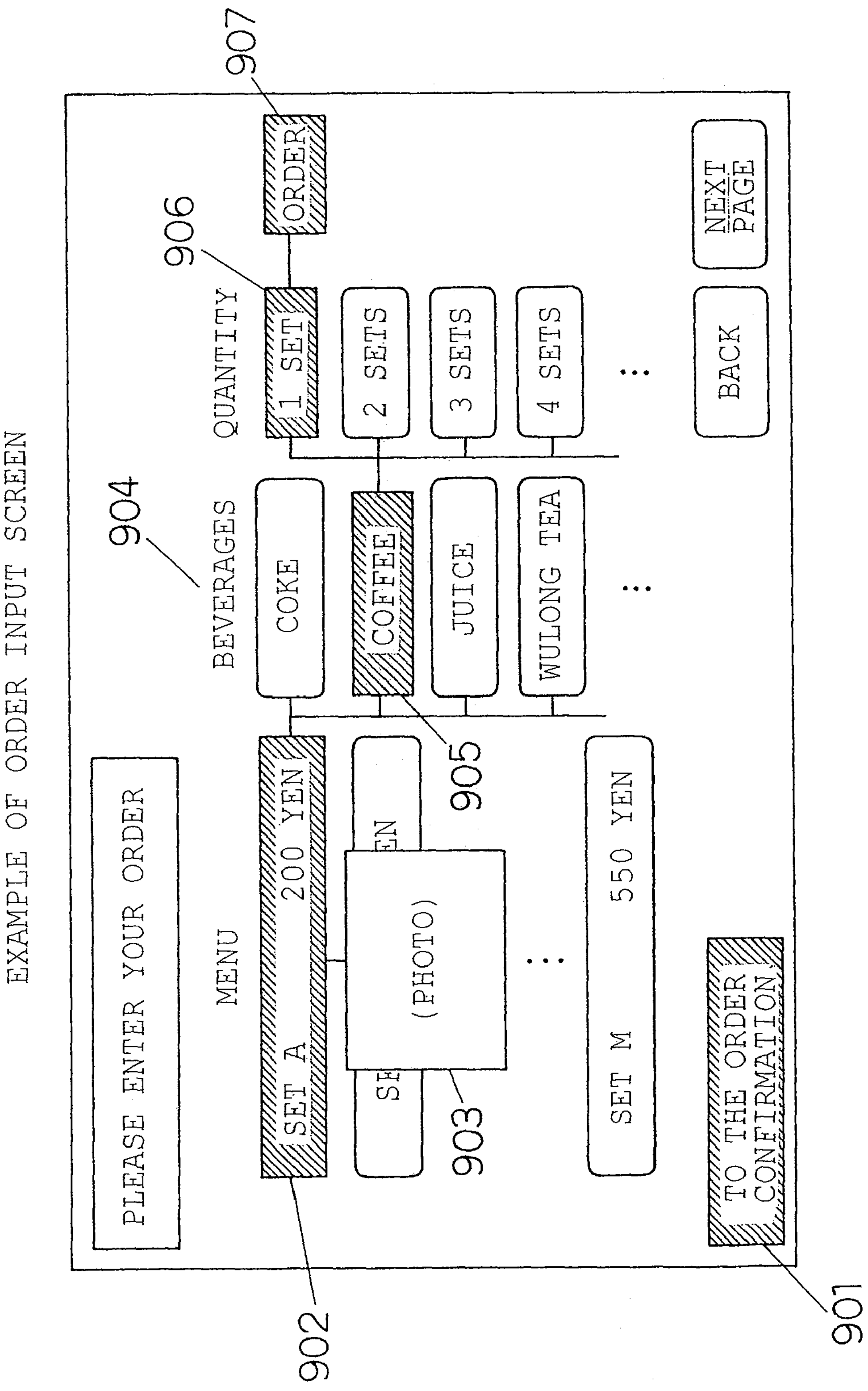
FIG. 9 is a diagram showing one example of an order input screen according to the embodiment of the present invention.
Figure 10:
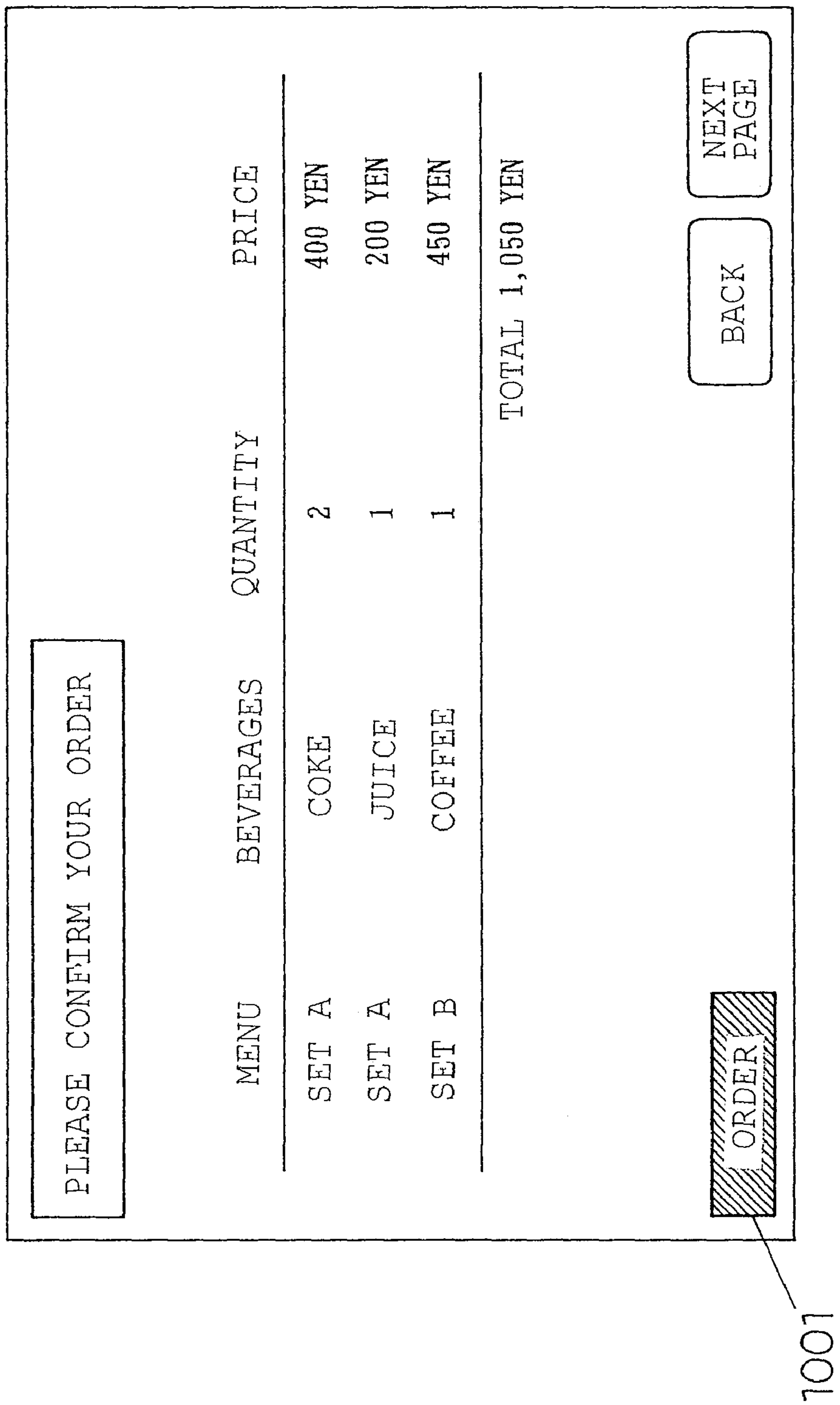
FIG. 10 is a diagram showing one example of an order confirmation screen according to the embodiment of the present invention.

The tags <name>, <price>, and <photo> are the same as those described previously, and will not be described in detail here. The tags under <option> are the same as those already described. FIGS. 9 and 10 each show an example of a screen produced when the data script for the order information is presented for display on the display section 120 of the in-vehicle information terminal 114.

The operation of the thus configured travel destination information setting system according to the first embodiment of the present invention will be described with reference to FIGS. 1 to 12.

First, the point of the first embodiment will be described. The travel program and the data related to the travel destination information, broadcast from the broadcast provider 101, are received by the television terminal 104 and displayed on the display section 110. While watching the program, the user downloads the travel destination information to the memory card 113 as needed by operating the television remote controller 108. When actually going out by car, the user transfers the travel destination information from the memory card 113 into the in-vehicle information terminal 114 and, using this information, the user sets the destination for vehicle route guidance, and accesses the Internet to acquire real-time travel destination information, make a reservation, etc.

First, the operation up to the time that the user, while watching the television program, downloads the travel destination information to the memory card 113 will be described.

The broadcast provider 101 transmits via the transmitting section 103 the travel program and the data broadcast of the travel destination information related to the program. FIG. 2 shows one example of the data broadcast script for the travel destination information. Next, the receiving section 105 of the television terminal 104 receives the program broadcast and the data broadcast, and passes the received information to the overall control section 111. The overall control section 111 processes the received information, and displays the program video and the data broadcast information on the display section 110. FIG. 3 shows one example of the screen produced on the display section 110. The overall control section 111 displays the program video in the area indicated at 305 in the figure, and displays the data broadcast in the areas indicated at 301 to 304 by decoding the data broadcast script.

Referring to FIGS. 2 and 3, a procedure of how the overall control section 111 decodes the data broadcast script will be described below. First, the overall control section 111 reads the description in <title> under the <displaydata> tag in the data broadcast script and displays it in the area 301 in FIG. 3, and reads the description below <information> under <displaydata> and displays it in the area 302.

Here, the contents are displayed by attaching titles such as "address" according to the attributes of the tags (<address>, etc.) under <information>. Further, the overall control section 111 reads the description in each tag <subcomment> under <comment> and displays it in the area 303 in FIG. 3, and since the data broadcast script of FIG. 2 is <naviprogram>, the overall control section 111 also displays a menu 304 allowing the user to select whether the travel information should be set into the in-vehicle information terminal.

Here, if the user viewing the program video is interested in the travel destination being broadcast, and desires to visit the place if he has a chance some day, the user selects the menu 304 by operating the television remote controller 108. Upon receiving this information, the remote control receiving section 109 notifies the overall control section 111 that the travel destination information should be set into the in-vehicle information terminal 114.

In response, the overall control section 111 performs the following processing. First, the data broadcast script under <navidata> is extracted from the data broadcast script shown in FIG. 2 and is sent to the card slot section 107, and is instructed to be downloaded the script to the memory card 113. The card slot section 107 downloads the script to the memory card 113. FIG. 4 shows one example of the thus downloaded <navidata> script.

At the same time, the overall control section 111 notifies the broadcast provider 101 that the user has downloaded the travel destination information. More specifically, the overall control section 111 reads the URL (<tvurl>) of the broadcast provider from the data broadcast script of FIG. 2, and accesses the viewer information acquiring section 102 via the modem 106 and sends information to the effect that the user has performed a download.

Using this information, the broadcast provider 101 can gather statistics on downloads, and if the travel destination information is an advertisement broadcast, the gathered information can be used to charge the sponsor for the advertisement. Gathering statistical information offers an enormous effect since it can be used, for example, for future marketing strategies.

It is desirable that the user insert the memory card 113 in the card slot section 107 before performing the download, but provisions may be made so that the card slot section 107, upon receiving the download instruction from the overall control section 111, checks whether the memory card 113 is inserted or not and, if not inserted, notifies the overall control section 111 accordingly which then issues an alarm via the display section 110 prompting the user to insert the memory card.

Next, a description will be given of the operation when the user who is going out by car transfers the travel destination information from the memory card 113 into the in-vehicle information terminal 114 and, using this information, sets the destination for vehicle route guidance and accesses the Internet to acquire real-time travel destination information, make a reservation, etc.

Figure 5:
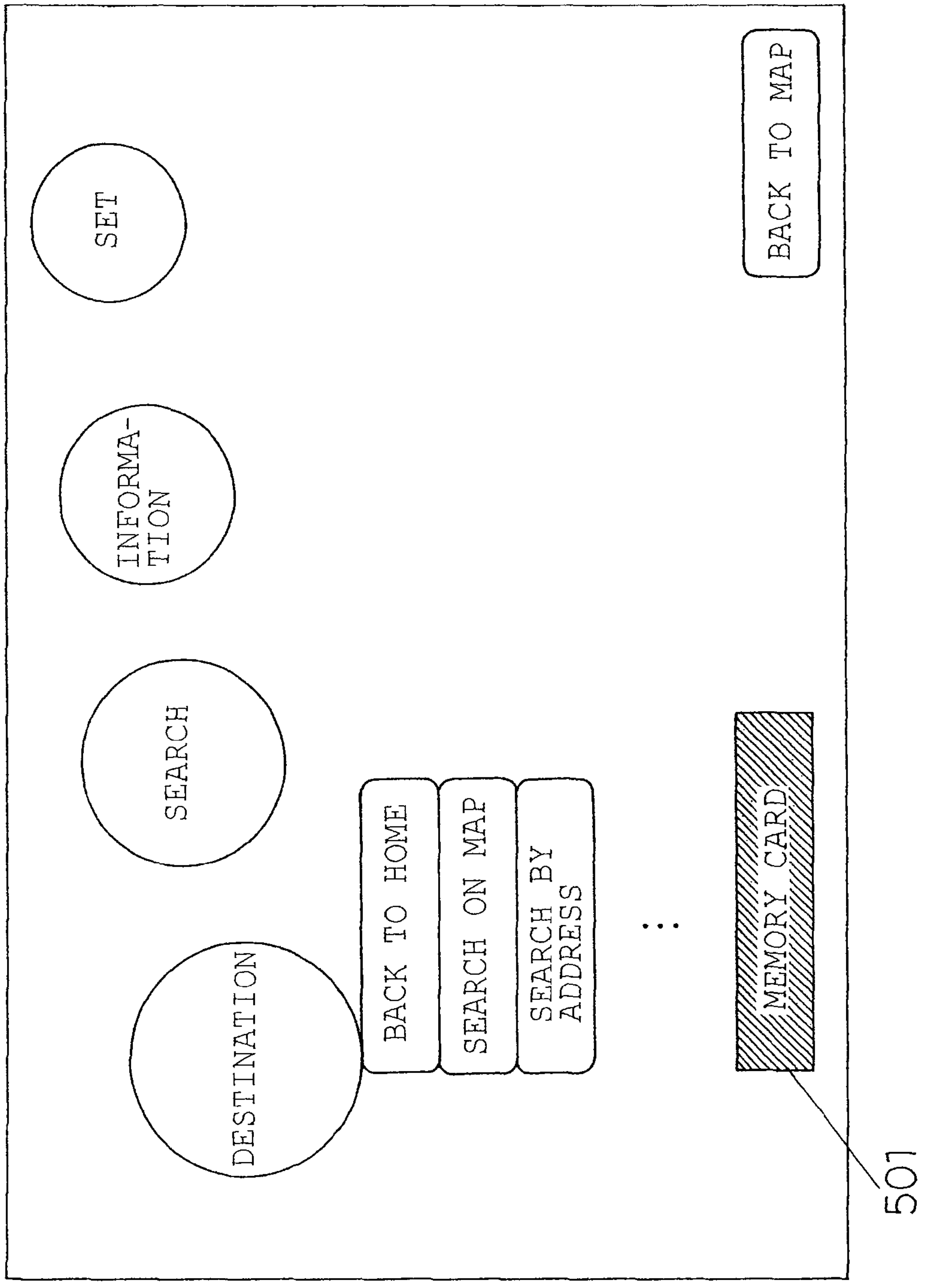
FIG. 5 is a diagram showing one example of the initial screen display of the in-vehicle information terminal according to the embodiment of the present invention.

The user inserts the memory card 113 with the data broadcast script downloaded thereto into the card slot section 118 of the in-vehicle information terminal 114, and turns on power (not shown) to the in-vehicle information terminal 114 which, under instruction from the overall control section 121, displays the initial screen on the display section 120. FIG. 5 shows one example of the initial screen.

Next, while viewing the screen such as shown in the figure, the user operates the in-vehicle terminal remote controller 115 and selects a memory card menu 501 from the travel destination setting menu. The in-vehicle terminal remote controller 115 transmits this information to the remote control receiving section 119 which then notifies the overall control section 121.

The overall control section 121 reads, via the card slot section 118, the <title> tag from each travel destination information <navidata> downloaded to the memory card 113, and displays it on the display section 120. FIG. 6 shows one example of the screen displaying the list of travel destination information downloaded to the memory card 113. While viewing the screen thus displayed, the user selects the desired travel destination information 601 by operating the in-vehicle terminal remote controller 115. At this time, information concerning this selection is sent from the in-vehicle terminal remote controller 115 to the overall control section 121 via the remote control receiving section 115, as previously described.

The overall control section 121 reads the contents below the <information> tag under <navidata> shown in FIG. 4, and displays them on the display section 120 in the following procedure. FIG. 7 shows one example of the screen which is displayed in the format of restaurant information.

First, the overall control section 121 reads the <restaurant> tag, identifies that the category of the travel destination information is "restaurant", and selects the predefined restaurant information display format (not shown). The overall control section 121 then reads the <name> tag under <restaurant>, and displays the contents in the area 701 in FIG. 7. Next, the overall control section 121 reads the tags <address>, <tel>, <email>, <opentime>, and <holiday> and displays the contents in the area 702 in FIG. 7. Further, the overall control section 121 reads each <submenu> tag under <menu>, and displays the contents in the area 703 in FIG. 7. Here, the menu items are displayed in a horizontal row together with their associated photos; if the number of menu items is too large to fit on the screen, the remaining menu items are displayed on the subsequent page(s). Here, the user can bring the next page onto the screen by selecting the "NEXT PAGE" menu in FIG. 7 by operating the in-vehicle terminal remote controller 115.

The user re-checks the travel destination information displayed on the screen of FIG. 7 and, if the user decides to set it as the destination, the user selects the destination setting menu 704 by operating the in-vehicle terminal remote controller 115.

Finally, the overall control section 121 sets the destination and the route to the destination on the in-vehicle information terminal, and acquires real-time information concerning the travel destination. The details are as follows. First, the overall control section 121 acquires the location of the travel destination by reading below the <point> tag in the data script of FIG. 4. The acquired location is sent to the route setting section 117, which then sets the destination and the route to the destination for car navigation. The route setting section 117 does this by using a known method employed for car navigation.

Next, the overall control section 121 reads the <url> tag in FIG. 4 to acquire the URL necessary to access the real-time travel destination information, and passes the URL to the communication section 116. The communication section 116 accesses the Internet, acquires the data script for the real-time travel destination information from the real-time information provider 122, and passes the acquired data script to the overall control section 121.

FIG. 11 shows one example of the data script for displaying the real-time information. FIG. 12 shows the detailed script under the <order> tag in FIG. 11. The overall control section 121 reads this real-time information data script, and presents it for display on the display section 120. Examples of the screen display are shown in FIGS. 8 to 10. The overall control section 121 reads the data script in sequence and presents the contents for display on the display section 120 in exactly the same way that it displays the travel destination information data script earlier described; therefore, the following description deals only with the correspondence between the data scripts of FIGS. 11 and 12 and the screen display examples of FIGS. 8 to 10.

The <updatetime> tag in FIG. 11 corresponds to the current status display at 801 in FIG. 8, <name> corresponds to the title display at 802, and the <photo> tag under <situation> corresponds to the photo at 803; likewise, <comment> corresponds to the comment at 804, and the presence of the <order> tag corresponds to the "TO THE ORDER SCREEN" menu 805. Further, <name> and <price> under the <order> tag in FIG. 12 correspond to the menu item 902 in FIG. 9, <photo> corresponds to the photo 903, and <type> under <option> and <name> under <submenu> correspond to 904 and 905, respectively.

While viewing the screen of FIG. 8, the user operates the in-vehicle terminal remote controller, checks the real-time information concerning the travel destination, and if necessary, can reserve a menu item. When reserving a menu item, the user selects the "TO THE ORDER SCREEN" menu 805 in FIG. 8 using the in-vehicle terminal remote controller 115, and makes an order by selecting the desired menu item on the order input screen of FIG. 9. In the present embodiment, the user is prompted to select the "TO THE ORDER CONFIRMATION" menu 901 in FIG. 9 and confirm the order on the order confirmation screen of FIG. 10.

When the user selects the "ORDER" menu 1001 using the in-vehicle terminal remote controller 115, the overall control section 121 creates a data script for the order information, and sends it to the real-time information provider 122 via the communication section 116. Creation of this data script can be accomplished by rewriting the <amount> tag in the order information data scrip of FIG. 12 to reflect the quantity ordered by the user.

The first embodiment of the invention described above has assumed that the broadcast provider 101 broadcasts programs via radio waves, but the means of broadcast transmission is not limited to any particular media; for example, CATV or other wired cable medium such as optical fiber may be used. Further, in this case, the user's viewing information can be transmitted to the broadcast provider 101 by using the same wired cable.

The first embodiment of the invention described above has also assumed that the in-vehicle information terminal 114 accesses the Internet by using a wireless communication, but any other means may be used; for example, a wireless communication and a leased line may be used instead of using the Internet.

In the first embodiment of the invention, the instruction to download the information to be set into the in-vehicle information terminal 114 is issued while the user is watching a program broadcast on the television terminal 104, but instead, the television terminal 104 may temporarily store the program broadcast and the data broadcast on the HDD 112, and the download instruction may be issued when the user watches the stored broadcast. Though not described in detail here, this can be accomplished in exactly the same manner by the overall control section 111 just switching between the broadcast sent from the receiving section 105 and the broadcast sent from the HDD 112.

Further, as earlier described, the data broadcast script to be broadcast from the broadcast provider 101 is structured such that the data script that can be handled by the in-vehicle information terminal 114 is embedded in the data script that can be handled by the television terminal 104, as shown in FIG. 2. Since only the script that can be handled by the in-vehicle information terminal 114 is extracted from the data broadcast script acquired by the television terminal 104 and is transferred to the in-vehicle information terminal 114 via the memory card 113, the in-vehicle information terminal 114 can receive only the data script that can be handled by it. In this way, despite the fact that the data script format that can be handled differs between the television terminal 104 and the in-vehicle information terminal 114, the data script that can be handled by the in-vehicle information terminal 114 can be easily transferred from the television terminal 104 to the in-vehicle information terminal 114 via the memory card 113. In the present embodiment, XML has been used as the programming language, but even if the programming language used differs between the television terminal 104 and the in-vehicle information terminal 114, the data can likewise be transferred from one to the other.

As described above, according to the travel destination information setting system in the first embodiment of the present invention, since the travel destination information is acquired from the broadcasted travel program and set into the in-vehicle information terminal, setting of the destination, acquisition of real-time information, and making of a reservation can be accomplished without performing cumbersome operations. This offers an enormous practical advantage.

Embodiment 2

A travel destination information setting system according to a second embodiment of the present invention will be described below with reference to drawings. In the second embodiment, the travel destination information to be set into the in-vehicle information terminal is stored in a data base, not on a memory card as in the first embodiment, and access to the data base is made via a portable terminal such as a portable telephone or a PDA. The user, therefore, need only carry the portable terminal he usually carries with him, and this can avoid the problem of the user forgetting the card.

Figure 13:
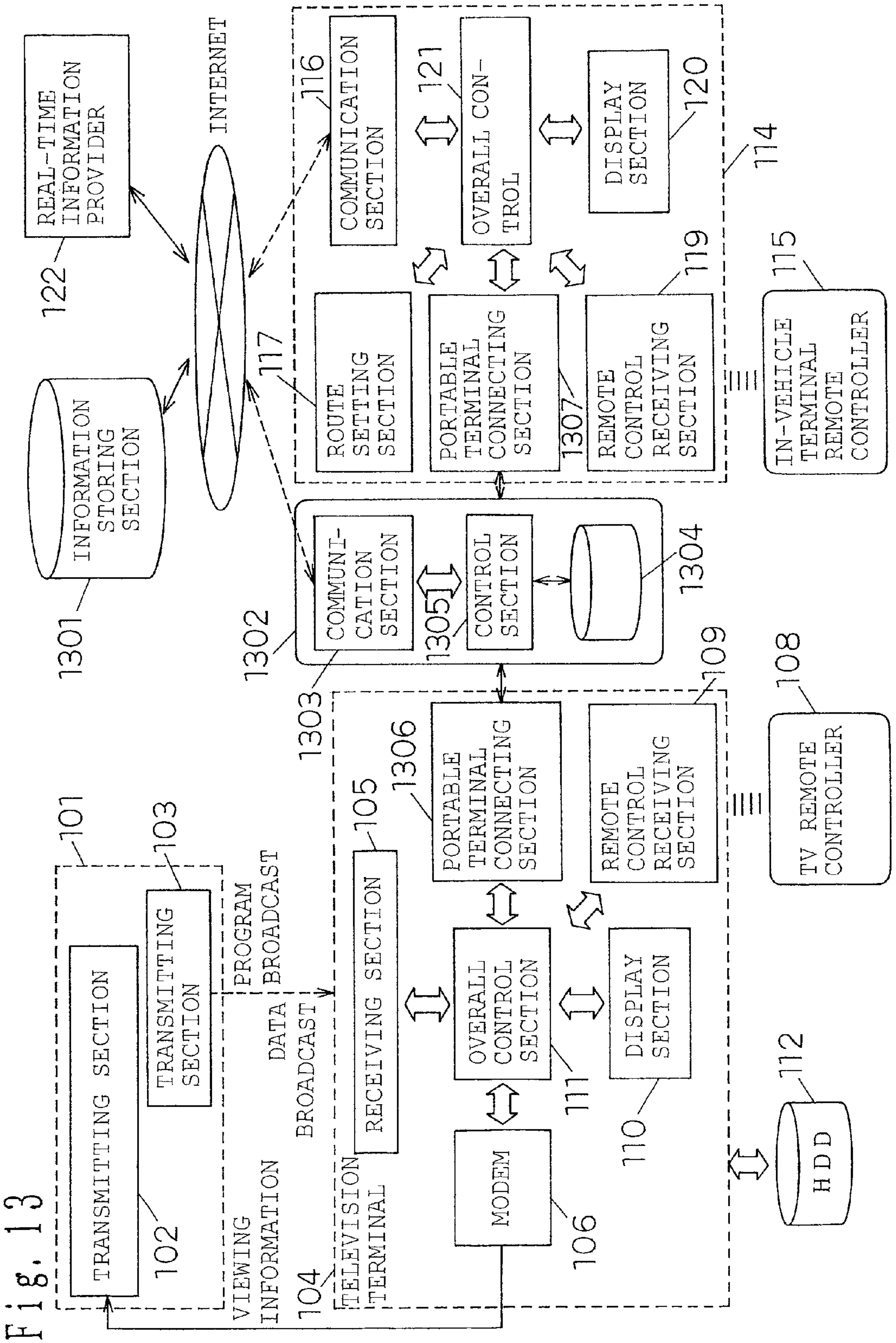
FIG. 13 is a diagram showing the configuration of a travel destination information setting system according to second and third embodiments of the present invention.

FIG. 13 is a diagram showing the configuration of the travel destination information setting system according to the second embodiment of the present invention. In the figure, reference numeral 1301 is an information storing section for storing the travel destination information to be set into the in-vehicle information terminal, 1302 is a portable terminal, such as a portable telephone, a PDA, or a wearable computer, that the user usually carries with him, 1303 is a communication section which controls the Internet communication of the portable terminal 1302, 1304 is an address storing section which holds the URL of the information storing section 1301, 1305 is a control section which controls the overall operation of the portable terminal 1302, 1306 is a portable terminal connecting section in the television terminal 104, and 1307 is a portable terminal connecting section in the in-vehicle information terminal 114. Otherwise, the configuration is the same as that of the first embodiment of the invention shown in FIG. 1, and therefore, will not be described in detail here.

The operation of the thus configured travel destination information setting system according to the second embodiment of the present invention will be described with reference to FIGS. 4 and 13.

To facilitate the explanation, the following description deals only with differences from the first embodiment. That is, in the first embodiment of the invention, the travel destination information to be set into the in-vehicle information terminal 114 is downloaded to the memory card 113 from the data broadcast script provided by the broadcast provider 101; by contrast, in the second embodiment of the invention, the information is downloaded to the information storing section 1301 on the Internet by using the Internet communication function of the portable terminal 1302.

First, the user connects the portable terminal 1302 to the portable terminal connecting section 1306. When the user decides to download the travel destination information currently being broadcasted, the overall control section 111 instructs the portable terminal connecting section 1306 to download the data script shown in FIG. 4. The portable terminal connecting section 1306 notifies the control section 1305 of the portable terminal 1302 that the data script will be downloaded.

The control section 1305 passes the data script to the communication section 1303 together with the URL of the information storing section 1301 stored in the address storing section 1304, and instructs the communication section 1303 to access the Internet. The communication section 1303 accesses the Internet by using the URL, and stores the data script in the information storing section 1301.

Next, when actually going out by car, the user connects the portable terminal 1302 to the portable terminal connecting section 1307. When the user needs the data script previously stored in the information storing section 1301, the portable terminal connecting section 1307, under instruction from the overall control section 121, acquires the data script from the information storing section 1301 on the Internet via the portable terminal 1302.

The portable terminal connecting section 1307 passes the thus acquired data script to the overall control section 121. The details of the operation that the portable terminal 1302 performs to access the Internet is exactly the same as the method of downloading described above.

Other operations of the travel destination information setting system according to the second embodiment of the present invention are exactly the same as those of the first embodiment, and therefore, will not be further described here.

The above description has assumed the use of a portable telephone, a PDA, or a wearable computer as the portable terminal 1302, but a portable terminal of other type can also be used as long as it is the type of information terminal that the user usually carries with him. Further, the information storing section 1301 has been described as being accessed via the Internet from the portable terminal 1302, but alternatively, the information storing section 1301 may be constructed from a home-use information storage device such as a home server, and access to the information storage device may be made via other means than the Internet, for example, via a short-range wireless communication means. This, however, requires that the information storage device be installed at a location accessible from the usual location of the in-vehicle information terminal 114, for example, the parking lot at or near the user's home. Further, the information storing section 1301 may be installed at other locations than that described above; for example, it may be installed within the broadcast provider 101 or the television terminal 104, or may be incorporated in the in-vehicle information terminal 114.

In the first embodiment of the invention, the instruction to download the information to be set into the in-vehicle information terminal 114 is issued while the user is watching a program broadcast on the television terminal 104, but instead, the television terminal 104 may temporarily store the program broadcast and the data broadcast on the HDD 112, and the download instruction may be issued when the user watches the stored broadcast. Though not described in detail here, this can be accomplished in exactly the same manner by the overall control section 111 just switching between the broadcast sent from the receiving section 105 and the broadcast sent from the HDD 112.

As described above, according to the travel destination information setting system in the second embodiment of the present invention, since the travel destination information is acquired from the broadcasted travel program and set into the in-vehicle information terminal, setting of the destination, acquisition of real-time information, and making of a reservation can be accomplished without performing cumbersome operations. Further, since the user need only carry the portable terminal he usually carries with him, the problem of the user forgetting the card can also be avoided. This offers an enormous practical advantage.

Embodiment 3

A travel destination information setting system according to a third embodiment of the present invention will be described below with reference to drawings. In the third embodiment, the travel destination information to be set into the in-vehicle information terminal is stored in a data base, not on a memory card as in the first embodiment, and the in-vehicle information terminal accesses the data base by acquiring the address of the data base from a portable terminal such as a portable telephone or a PDA. Therefore, as in the second embodiment, since the user need to only carry the portable terminal he usually carries with him, the problem of the user forgetting the card can be avoided.

FIG. 13 is a diagram showing the configuration of the travel destination information setting system according to the third embodiment of the present invention. As shown, the configuration of the travel destination information setting system according to the third embodiment of the invention is the same as that of the second embodiment, and therefore, will not be described in detail here.

The operation of the thus configured travel destination information setting system according to the third embodiment of the present invention will be described with reference to FIGS. 4 and 13.

To facilitate the explanation, the following description focuses on differences from the first and second embodiments. That is, in the third embodiment, as in the second embodiment, the travel destination information is downloaded to the information storing section 1301 on the Internet by using the Internet communication function of the portable terminal 1302, but the difference from the second embodiment is that the in-vehicle information terminal 114 itself downloads the travel destination information from the information storing section 1301.

First, the user connects the portable terminal 1302 to the portable terminal connecting section 1306. When the user decides to download the travel destination information currently being broadcasted, the overall control section 111 instructs the portable terminal connecting section 1306 to download the data script shown in FIG. 4. The portable terminal connecting section 1306 notifies the control section 1305 of the portable terminal 1302 that the data script will be downloaded.

The control section 1305 passes the data script to the communication section 1303 together with the URL of the information storing section 1301 stored in the address storing section 1304, and instructs the communication section 1303 to access the Internet. The communication section 1303 accesses the Internet by using the URL, and stores the data script in the information storing section 1301.

Next, when actually going out by car, the user connects the portable terminal 1302 to the portable terminal connecting section 1307. When the user needs the data script previously stored in the information storing section 1301, the portable terminal connecting section 1307, under instruction from the overall control section 121, requests the URL of the information storing section 1301 from the portable terminal 1302. In accordance with this request, the control section 1305 of the portable terminal 1302 reads the URL of the information storing section 1301 from the address storing section 1304, and transfers the thus readout URL to the portable terminal connecting section 1307.

The portable terminal connecting section 1307 transfers the URL of the information storing section 1301, input from the portable terminal 1302, to the overall control section 121, and the overall control section 121 then passes the URL to the communication section 116 and instructs it to acquire the data script from the information storing section 1301. In response, the communication section 116 accesses the Internet, downloads from the information storing section 1301 the data script specified by the URL input from the overall control section 121, and passes the downloaded script to the control section 121.

Other operations of the travel destination information setting system according to the third embodiment of the present invention are exactly the same as those of the first embodiment and, therefore, will not be further described here.

As described above, according to the travel destination information setting system in the third embodiment of the present invention, since the travel destination information is acquired from the broadcasted travel program and set into the in-vehicle information terminal, setting of the destination, acquisition of real-time information, and making of a reservation can be accomplished without performing cumbersome operations. Further, since the user need only carry the portable terminal he usually carries with him, the problem of the user forgetting the card can also be avoided. This offers an enormous practical advantage.

Embodiment 4

A travel destination information setting system according to a fourth embodiment of the present invention will be described below with reference to drawings. In the fourth embodiment, the travel destination information to be set into the in-vehicle information terminal is not transmitted by data broadcasting from the broadcast provider to the television terminal, but the broadcast provider stores the information directly in a data base by responding to a request from the user, and when the user actually goes out by car, the in-vehicle information terminal accesses the data base and downloads the travel destination information. Accordingly, the travel destination information can be set quite naturally into the in-vehicle information terminal without the user being aware of the downloading of the travel destination information.

Figure 14:
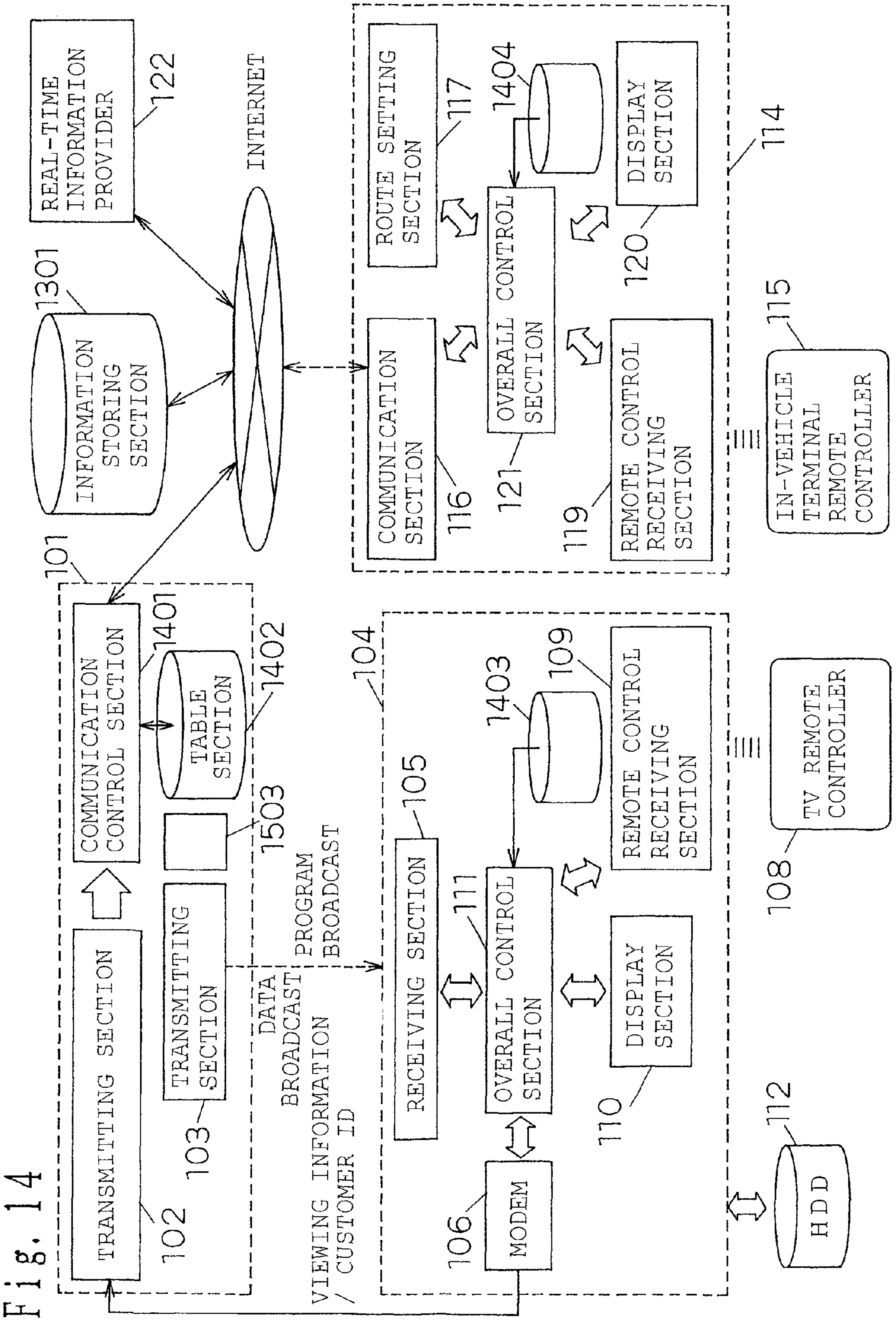
FIG. 14 is a diagram showing the configuration of a travel destination information setting system according to a fourth embodiment of the present invention.

FIG. 14 is a diagram showing the configuration of the travel destination information setting system according to the fourth embodiment of the present invention. In the figure, reference numeral 1401 is a communication control section which performs communication control for accessing the information storing section 1301, 1402 is a table section which holds information that the broadcast provider 101 uses to access the information storing section 1301, 1403 is a television terminal ID storing section which holds an ID for identifying the television terminal 104, and 1404 is an in-vehicle information terminal ID storing section which holds an ID for identifying the in-vehicle information terminal and the URL of the information storing section 1301. Otherwise, the configuration is the same as that of the first embodiment of the invention shown in FIG. 1 and that of the second embodiment of the invention shown in FIG. 13, and will not be described in detail here.

Figure 15:
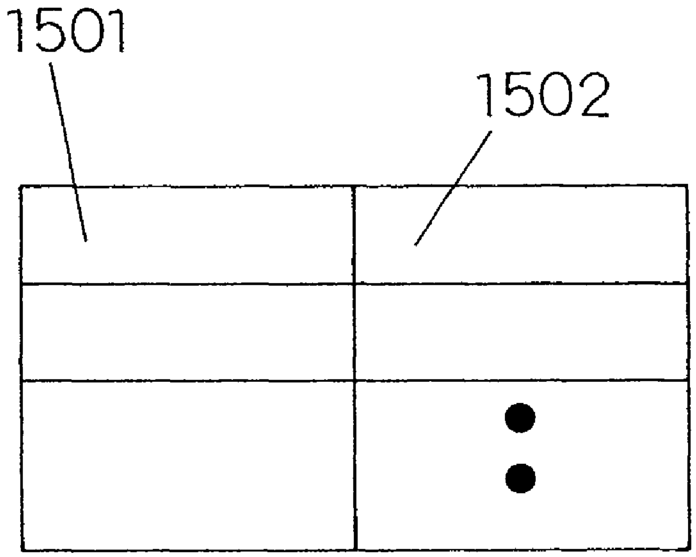
FIG. 15 is a diagram showing the detailed structure of a table section 1402 shown in FIG. 14.

FIG. 15 is a diagram showing the structure of the table section 1402. In the figure, reference numeral 1501 is a TV terminal ID holding section for holding TV terminal IDs, and 1502 is an in-vehicle information terminal ID holding section for holding in-vehicle information terminal IDs; that is, this table shows the correspondence between each TV terminal ID and each in-vehicle information terminal ID. Further, reference numeral 1503 is a URL holding section for holding the URL of the information storing section 1301.

The operation of the thus configured travel destination information setting system according to the fourth embodiment of the present invention will be described below with reference to FIGS. 14 and 15. To facilitate the explanation, the following description deals only with differences from the first and second embodiments.

That is, in the fourth embodiment, the broadcast provider stores the travel destination information directly in the information storing section 1301.

First, when the user decides that he will need the broadcasted travel destination information at a later date, the overall control section 111 instructs the broadcast provider 101 via the modem 106 to store the travel destination information in the information storing section 1301.

At the same time, the overall control section 111 acquires the television terminal ID from the television terminal ID storing section 1403, and passes it to the modem 106. The modem 106 then instructs the broadcast provider 101 to store the television terminal ID in the information storing section 1301 together with the travel destination information currently being broadcasted in the program.

The viewer information acquiring section 102 passes this instruction and the television terminal ID to the communication control section 1401. The communication control section 1401 acquires the in-vehicle information terminal ID corresponding to the television terminal ID by referring to the table section 1402, and also acquires the URL of the information storing section 1301 corresponding to the television terminal 104 by referring to the URL holding section 1503. Then, the communication control section 1401 accesses the Internet by using the URL, and stores the travel destination information to be set into the in-vehicle information terminal in an area in the information storing section 1301 which is specified by the in-vehicle information terminal ID. As in the case of the first and second embodiments, the travel destination information to be set into the in-vehicle information terminal is the data script shown in FIG. 4.

As this time, since the broadcast provider 101 knows that the user has downloaded the travel destination information, the broadcast provider 101 can gather statistics or charge an advertisement fee to the sponsor's bill by using the information concerning the download, as in the case of the first, second, and third embodiments of the invention. In the present embodiment, since the television terminal ID equivalent to the user ID can be acquired, it is also possible to extract user preferences by gathering statistics.

Next, when the user actually goes out by car, the overall control section 121 acquires the in-vehicle information terminal ID and the URL of the information storing section 1301 from the in-vehicle information terminal ID storing section 1404, and passes them to the communication section 116. The communication section 116 accesses the Internet by using the URL, and acquires the data script of the travel destination information from the area in the information storing section 1301 which is specified by the in-vehicle information terminal ID. The communication section 116 passes the acquired data script to the overall control section 121.

Other operations are exactly the same as those of the first embodiment, and therefore, will not be further described here.

Finally, the method of constructing the table section 1402 will be described. For example, first the television terminal ID is implemented into the television terminal ID storing section 1403 at the time the television terminal 104 is manufactured. Next, when the user purchases the television terminal 104, the retailer provides the television terminal ID and the customer's personal information such as his address to the broadcast provider, and the television broadcast provider stores these pieces of information in the data base.

Likewise, the in-vehicle information terminal ID is implemented into the in-vehicle information terminal ID storing section 1404 at the time the in-vehicle information terminal 114 is manufactured. When the same user purchases the in-vehicle information terminal 114, the user registers the in-vehicle information terminal ID and his personal information such as his address with the service provider that operates the information storing section 1301. Then, the service provider provides the in-vehicle information terminal ID and the customer's personal information such as his address to the broadcast provider 101 together with the URL of the information storing section 1301.

The broadcast provider 101 searches the data base for the customer having the same personal information from the information stored when the user purchased the television terminal 104 and, if the same customer is found, the broadcast provider 101 stores the television terminal ID, the in-vehicle information terminal ID, and the URL of the information storing section 1301 as a set of information in the table section 1402 and the URL holding section 1503.

As described above, in the fourth embodiment, the table section 1402 holds the TV terminal ID and the in-vehicle information terminal ID. The television terminal ID for identifying the television terminal 104 is appended to the television terminal 104. On the other hand, the in-vehicle information terminal ID for identifying the in-vehicle information terminal 114 is appended to the in-vehicle information terminal 114. The broadcast provider 101 holds in the table section 1402 the information for associating the television terminal ID with the in-vehicle information terminal ID. When sending a request to the broadcast provider 101, the television terminal 104 also sends its own television terminal ID to the broadcast provider 101, and the broadcast provider 101 pairs the in-vehicle information terminal ID corresponding to the reported television terminal ID with the requested data script by referring to the associating information held in the table section 1402, and stores the pair in the information storing section 1301, while on the other hand, the in-vehicle information terminal 114, using its own in-vehicle information terminal ID, acquires the corresponding data script from the information storing section 1301.

Alternatively, the table section 1402 may be constructed to hold only the TV terminal ID and not hold the in-vehicle information terminal ID. Conversely, the table section 1402 may be constructed to hold only the in-vehicle information terminal ID and not hold the TV terminal ID.

That is, when the table section 1402 is constructed to hold only the TV terminal ID and not hold the in-vehicle information terminal ID, the data script can be downloaded into the in-vehicle information terminal 114 in the following way.

First, when the user decides that he will need the broadcasted travel destination information at a later date, the overall control section 111 instructs the broadcast provider 101 via the modem 106 to store the travel destination information in the information storing section 1301.

At the same time, the overall control section 111 acquires the television terminal ID from the television terminal ID storing section 1403, and passes it to the modem 106. The modem 106 then instructs the broadcast provider 101 to store the television terminal ID in the information storing section 1301 together with the travel destination information currently being broadcasted in the program.

The viewer information acquiring section 102 passes this instruction and the television terminal ID to the communication control section 1401. The communication control section 1401 acquires the URL of the information storing section 1301 corresponding to the television terminal 104 by referring to the URL holding section 1503. Then, the communication control section 1401 accesses the Internet by using the URL, and stores the travel destination information to be set into the in-vehicle information terminal in the area of the information storing section 1301 which is specified by the television terminal ID.

Next, when the user actually goes out by car, the overall control section 121 acquires the television terminal ID and the URL of the information storing section 1301 from the in-vehicle information terminal ID storing section 1404, and passes them to the communication section 116. Here, it is assumed that the television terminal ID and the URL of the information storing section 1301 are stored in advance in the in-vehicle information terminal ID storing section 1404. The communication section 116 accesses the Internet by using the URL, and acquires the data script of the travel destination information from the area of the information storing section 1301 which is specified by the television terminal ID. The communication section 116 passes the acquired data script to the overall control section 121.

In this way, the television terminal ID for identifying the television terminal 104 is appended to the television terminal 104, and when sending a request to the broadcast provider 101, the television terminal 104 also sends its own television terminal ID to the broadcast provider 101 which then pairs the reported television terminal ID with the requested data script and stores the pair in the information storing section 1301, while on the other hand, the in-vehicle information terminal 114, using the television terminal ID input to it, acquires the corresponding data script from the information storing section 1301.

On the other hand, when the table section 1402 is constructed to hold only the in-vehicle information terminal ID and not hold the TV terminal ID, the data script can be downloaded into the in-vehicle information terminal 114 in the following way.

First, when the user decides that he will need the broadcasted travel destination information at a later date, the overall control section 111 instructs the broadcast provider 101 via the modem 106 to store the travel destination information in the information storing section 1301.

At the same time, the overall control section 111 acquires the in-vehicle information terminal ID from the television terminal ID storing section 1403, and passes it to the modem 106. Here, it is assumed that the in-vehicle information terminal ID is stored in advance. The modem 106 then instructs the broadcast provider 101 to store the in-vehicle information terminal ID in the information storing section 1301 together with the travel destination information currently being broadcasted in the program.

The viewer information acquiring section 102 passes this instruction and the in-vehicle information terminal ID to the communication control section 1401. The communication control section 1401 acquires the URL of the information storing section 1301 corresponding to the in-vehicle information terminal 114 by referring to the URL holding section 1503. Then, the communication control section 1401 accesses the Internet by using the URL, and stores the travel destination information to be set into the in-vehicle information terminal in the area of the information storing section 1301 which is specified by the in-vehicle information terminal ID.

Next, when the user actually goes out by car, the overall control section 121 acquires the in-vehicle information terminal ID and the URL of the information storing section 1301 from the in-vehicle information terminal ID storing section 1404, and passes them to the communication section 116. Here, it is assumed that the in-vehicle information terminal ID and the URL of the information storing section 1301 are stored in advance in the in-vehicle information terminal ID storing section 1404. The communication section 116 accesses the Internet by using the URL, and acquires the data script of the travel destination information from the area of the information storing section 1301 which is specified by the in-vehicle information terminal ID. The communication section 116 passes the acquired data script to the overall control section 121.

In this way, the in-vehicle information terminal ID for identifying the in-vehicle information terminal 114 is appended to the in-vehicle information terminal 114, and when sending a request to the broadcast provider 101, the television terminal 104 also sends the in-vehicle information terminal ID input to it to the broadcast provider 101 which then pairs the reported in-vehicle information terminal ID with the requested data script and stores the pair in the information storing section 1301, while on the other hand, the in-vehicle information terminal 114, using its own in-vehicle information terminal ID, acquires the corresponding data script from the information storing section 1301.

Here, the service provider that operates the information storing section 1301 may be the same as the broadcast provider. Further, the personal information may be constructed from a special number such as a personal ID.

The URL of the information storing section 1301 to be held in the in-vehicle information terminal ID storing section 1404 of the in-vehicle information terminal 114 may be implemented at the time the in-vehicle information terminal is manufactured, or may be set at the time the user purchases the in-vehicle information terminal.

Furthermore, the above-described operation in which the broadcast provider 101 stores the information in the table section 1402 and the URL holding section 1503 by referring to the data base with the personal information as the key can also be performed automatically by using information technology.

As described above, according to the travel destination information setting system in the fourth embodiment of the present invention, since the travel destination information is acquired from the broadcasted travel program and set into the in-vehicle information terminal, setting of the destination, acquisition of real-time information, and making of a reservation can be accomplished without performing cumbersome operations. Further, since the user need not use a memory card or a portable terminal in order to access the travel destination information to be set into the in-vehicle information terminal 114, the operation can be performed quite naturally. Moreover, the problem of the user losing or forgetting the memory card or the portable terminal does not occur. This offers an enormous practical advantage.

In FIG. 14, only one information storing section 1301 is shown, but more than one information storing section may be provided. Further, the installation of the information storing section 1301 is not limited to any particular location, and it may be installed within the broadcast provider 101 or the television terminal 104, or may be incorporated in the in-vehicle information terminal 114.

In the above description, the instruction to download the information to be set into the in-vehicle information terminal 114 is issued while the user is watching a program broadcast, but instead, the television terminal 104 may temporarily store the program broadcast and the data broadcast on the HDD 112, and the download instruction may be issued when the user watches the stored broadcast. In this case, however, though not described in detail here, a program ID must be provided to the broadcast provider 101 via the modem 106 so that the broadcast provider 101 can identify the program whose travel destination information is to be stored. This can be accomplished by transmitting the broadcast data by appending the program ID to it.

In the description of each embodiment of the invention, the travel destination information is set into the in-vehicle information terminal 114, but the information can likewise be set into a portable information terminal having, for example, a pedestrian navigation function.

Further, each embodiment of the invention has been described by assuming a restaurant as the travel destination, but there are many other places, such as an amusement park, spa, etc., that can be set as the travel destination, and the destination is therefore not limited to a restaurant. For example, when the travel destination is an amusement park, the real-time information includes, for example, attractions to be held in the park, availability of parking space in the parking lot, etc., and the reservation includes, for example, the reservation of a parking space or a stroller, purchase of a ticket, etc. When the travel destination is a hotel or an inn, the real-time information includes, for example, the availability of rooms, and the reservation includes, for example, the reservation of meals or accommodations or cancellation of accommodations, etc. Further, in the case of a museum or an exhibition hall, the real-time information includes, for example, the description of the exhibits, the period of the exhibition, exhibition seminar schedules, the state of congestion, etc., and the reservation includes, for example, the purchase of a ticket, reservation for an exhibition seminar, etc.

The present invention includes a program for causing a computer to carry out the functions of all or part of the means (or devices, elements, circuits, blocks, etc.) of the system (apparatus, circuit, etc.) of the invention described above, wherein the program operates in collaboration with the computer.

The invention also includes a program for causing a computer to carry out the operations in all or part of the steps (or processes, operations, effects, etc.) of the navigation method of the invention described above, wherein the program operates in collaboration with the computer.

Further, the present invention includes a medium holding thereon a program for causing a computer to carry out all or part of the functions of all or part of the means of the system (apparatus, circuit, etc.) of the invention described above, wherein the program readable by the computer is read by the computer and carries out the functions in collaboration with the computer.

The invention further includes a medium holding thereon a program for causing a computer to carry out all or part of the operations in all or part of the steps of the navigation method of the invention described above, wherein the program readable by the computer is read by the computer and carries out the operations in collaboration with the computer.

Here, part of the means (or devices, elements, circuits, blocks, etc.) of the invention and part of the steps (or processes, operations, effects, etc.) of the invention refer to some of the plurality of means or steps, or some of the functions or operations in one of the means or steps.

A computer readable recording medium with the program of the invention recorded thereon is also included in the present invention.

In one utilization mode of the program of the invention, the program may be recorded on a recording medium readable by a computer, and be operated in collaboration with the computer.

In another utilization mode of the program of the invention, the program may be transmitted through a transmission medium, be read by a computer, and be operated in collaboration with the computer.

The data structure of the invention includes a data base, data format, data list, data type, etc.

The recording medium includes a ROM or the like, and the transmission medium includes a transmission medium such as the Internet, light waves, radio waves, or sound waves.

The computer of the invention described above is not limited to pure hardware such as a CPU, but may include firmware, an OS, and even a peripheral device.

As described above, the configuration of the invention may be implemented in software or in hardware.

The navigational information according to the present invention is not limited to the travel destination information described in the above embodiments, but it also includes, for example, gourmet information for dining out, bargain sale information for going out for shopping, movie information for going out to see a movie, and sports information for going out to watch a sports game, that is, any information that the user can use when he goes out. For example, when the navigational information according to the present invention is bargain sale information, a script that holds therein information for displaying the bargain sale information should be created instead of the travel destination information data script used in the above embodiments.

The broadcast provider 101 in the above embodiments is an example of a first system of the present invention, the television terminal 104 in the above embodiments is an example of a second system of the present invention, the in-vehicle information terminal 114 in the above embodiments is an example of a third system of the present invention, the television terminal ID in the above embodiments is an example of a first ID of the present invention, the in-vehicle information terminal ID in the above embodiments is an example of a second ID of the present invention, the information storing section 1301 in the above embodiments is an example of an information storing means of the present invention, the portable terminal 1302 in the above embodiments is an example of a portable information processing means of the present invention, the memory card in the above embodiments is an example of a portable memory means of the present invention, and each travel destination information data script indicated by the <navidata> tag in the above embodiments is an example of navigational information of the present invention.

Examples of the broadcast receiving system (television terminal, etc.) used in the system of the present invention may include the following:

(Example 1) A broadcast receiving system comprising: means of receiving a program and/or an advertisement transmitted from a transmitting entity and navigational information transmitted in addition to the program and/or the advertisement; display means of displaying the program and/or the advertisement; means of selecting the navigational information between the navigational information and other information such as the program received by the receiving means; and means of storing the navigational information in a portable memory means or a portable information processing means.

(Example 2) A broadcast receiving system as described in example 1, further comprising: information storing means; and means of requesting the transmitting entity of the program and/or the advertisement to download the navigational information related to the program and/or the advertisement into the information storing means.

(Example 3) A broadcast receiving system as described in example 1, further comprising means of requesting, in response to a user request, the transmitting entity of the program and/or the advertisement to download the navigational information related to the program and/or the advertisement into an external information storing means.

(Example 4) A broadcast receiving system as described in example 2 or 3, wherein the information storing means holds therein: at least either a first ID indicating the broadcast receiving terminal that the user uses or a second ID indicating the navigation terminal that the user uses; and the navigational information requested by the user.

(Example 5) A broadcast receiving system as described in example 2 or 3, wherein the information storing means holds therein: information for associating a first ID indicating the broadcast receiving terminal that the user uses with a second ID indicating the navigation terminal that the user uses; the second ID obtained based on the associating information as corresponding to the first ID reported from the user; and the navigational information requested by the user.

(Example 6) A broadcast receiving system as described in example 2 or 3, wherein the information storing means holds therein: information for associating a first ID indicating the broadcast receiving terminal that the user uses with a second ID indicating the navigation terminal that the user uses; the first ID obtained based on the associating information as corresponding to the second ID reported from the user; and the navigational information requested by the user.

(Example 7) A broadcast receiving system as described in example 2 or 3, wherein when requesting the transmitting entity to download the navigational information into the information storing means, an ID indicating the broadcast receiving terminal that the user uses is reported to the transmitting entity.

(Example 8) A broadcast receiving system as described in example 2 or 3, wherein when requesting the transmitting entity to download the navigational information into the information storing means, an ID indicating the navigation terminal that the user uses is reported to the transmitting entity.

Examples of the navigation system (navigation terminal, etc.) used in the system of the present invention may include the following:

(Example 1) A navigation system comprising: memory means; display means; information storing means; input means of acquiring from a portable information processing means the address of the information storing means in which the portable information processing means stores navigational information; and communication means of acquiring the navigational information from the information storing means by accessing the address, wherein the navigational information acquired via the communication means is stored in the memory means, and a navigation display based on the navigational information stored in the memory means is produced by the display means.

(Example 2) A navigation system as described in example 1, wherein the information storing means holds therein: at least either a first ID indicating the broadcast receiving terminal that the user uses or a second ID indicating the navigation terminal that the user uses; and the navigational information requested by the user.

(Example 3) A navigation system as described in example 1, wherein the information storing means holds therein: information for associating a first ID indicating the broadcast receiving terminal that the user uses with a second ID indicating the navigation terminal that the user uses; the second ID obtained based on the associating information as corresponding to the first ID reported from the user; and the navigational information requested by the user.

(Example 4) A navigation system as described in example 1, wherein the information storing means holds therein: information for associating a first ID indicating the broadcast receiving terminal that the user uses with a second ID indicating the navigation terminal that the user uses; the first ID obtained based on the associating information as corresponding to the second ID reported from the user; and the navigational information requested by the user.

(Example 5) A navigation system as described in each of examples 2, 3, and 4, wherein when making an access to the information storing means, an ID indicating the broadcast receiving terminal that the user uses is reported to the information storing means.

(Example 6) A navigation system as described in each of examples 2, 3, and 4, wherein when making an access to the information storing means, an ID indicating the navigation terminal that the user uses is reported to the information storing means.

As described above, according to the travel destination information setting system in each of the above embodiments, since the travel destination information is downloaded as electronic data, the travel destination information can be set into the in-vehicle information terminal without the user having to make a memo of the travel destination information broadcasted in a program. This eliminates the need for the user to make settings on the in-vehicle information terminal by looking at a handwritten memo, and greatly saves the user the trouble of going through cumbersome operations. Further, since each of the above embodiments includes information storing means, and the travel destination information is acquired by connecting to the information storing means, the travel destination information can be prevented from being lost somewhere. This offers an enormous practical advantage.

As is apparent from the above description, the present invention provides a travel destination information setting system that can save the user a lot of trouble by eliminating the need to manually re-enter the navigational information acquired from a broadcast when the user actually goes out, and also provides a system, a navigation method, a medium, and a program for such a system.

Further, the present invention provides a travel destination information setting system that can prevent the navigational information from being input erroneously or being lost somewhere, by eliminating the need to manually re-enter the navigational information acquired from a broadcast when the user actually goes out, and also provides a system, a navigation method, a medium, and a program for such a system.

The invention claimed is:

1. A system comprising:

a first system which broadcasts navigational information in relation to a program and/or an advertisement, in addition to at least one of the program and the advertisement;

a second system which receives said broadcast and transfers said navigational information contained in said received broadcast to a portable memory means for storing therein; and a third system which produces a navigation display by acquiring said navigational information stored in said portable memory means;

wherein, the at least one of the program and the advertisement is presented to a user before said navigational information is acquired.

2. A system which uses a portable information processing means that can store at least navigational information in an information storing means and can acquire at least said navigational information from said information storing means, said system comprising:

a first system which broadcasts navigational information in relation to a program and/or an advertisement, in addition to at least one of the program and the advertisement;

the first system containing a travel program and at least one travel destination;

a second system which receives said broadcast and outputs said navigational information contained in said received broadcast to said portable information processing means;

the second system transferring said navigational information regarding the at least one travel destination to the portable information processing means, and a third system which produces a navigation display by acquiring via said portable information processing means said navigational information that said portable information processing means stored in said information storing means;

the third system navigating to the at least one travel destination using the navigational information stored in the portable information processing means wherein, the at least one of the program and the advertisement is presented to a user before said navigational information is acquired.

3. A system which uses a portable information processing means that can store at least navigational information in an information storing means and can output an address of said information storing means, said system comprising:

a first system which broadcasts navigational information in relation to a program and/or an advertisement, in addition to at least one of the program and the advertisement;

the first system containing a travel program and at least one travel destination;

a second system which receives said broadcast and outputs said navigational information contained in said received broadcast to said portable information processing means;

the second system transferring said navigational information regarding the at least one travel destination to the portable information processing means; and a third system which acquires the address of said information storing means from said portable information processing means, and produces a navigation display by acquiring said navigational information by accessing said information storing means based on said address;

the third system navigating to the at least one travel destination using the navigational information stored in the portable information processing means wherein, the at least one of the program and the advertisement is presented to a user before said navigational information is acquired.

4. A system comprising:

a first system which broadcasts navigational information in relation to a program and/or an advertisement, in addition to at least one of the program and the advertisement;

the first system containing a travel program and at least one travel destination;

a second system which receives said broadcast and presents said program and/or said advertisement to a user, and which, in response to a request from said user, requests said first system to download said navigational information related to said program and/or said advertisement into an information storing means;

the second system transferring said navigational information regarding the at least one travel destination to the portable information processing means; and a third system which produces a navigation display by acquiring said navigational information that said first system downloaded into said information storing means in response to the request from said second system;

the third system navigating to the at least one travel destination using the navigational information stored in the portable information processing means.

5. A first system which broadcasts navigational information in relation to a program and/or an advertisement, and at least one of the program and the advertisement, wherein the at least one of the program and the advertisement is presented to a user before said navigational information is acquired.

6. A second system comprising means of receiving a broadcast from a first system broadcasting navigational information in relation to a program and/or an advertisement, and at least one of the program and the advertisement, and of having portable memory means storing therein said navigational information contained in said received broadcast, wherein the at least one of the program and the advertisement is presented to a user before said navigational information is acquired.

7. A second system comprising means of receiving a broadcast from a first system broadcasting navigational information in relation to a program and/or an advertisement, and at least one of the program and the advertisement, and of outputting said navigational information contained in said received broadcast to a portable information processing means;

wherein the at least one of the program and the advertisement is presented to a user before said navigational information is acquired.

8. A second system comprising:

means of receiving a broadcast from a first system broadcasting navigational information in relation to a program and/or an advertisement, and at least one of the program and the advertisement, and of presenting said program and/or said advertisement to a user and, in response to a request from said user and after said program is presented to said user, transferring said navigational information related to said program and/or said advertisement to portable memory means for storing therein.

9. A second system comprising means of receiving a broadcast from a first system broadcasting navigational information in relation to a program and/or an advertisement, and at least one of the program and the advertisement, and of presenting said program and/or said advertisement to a user and, in response to a request from said user and after said program is presented to said user, outputting said navigational information related to said program and/or said advertisement to portable information processing means.

10. A second system as described in any one of claims 6-9, wherein said first system includes an information storing means, and said second system comprises means of requesting, in response to a request from a user, said first system to download said navigational information related to said program and/or said advertisement into said information storing means.

11. A second system as described in any one of claims 6-9, comprising means of requesting, in response to a request from a user, said first system to download said navigational information related to said program and/or said advertisement into an external information storing means.

12. A third system comprising:

input means of acquiring navigational information in relation to a program and/or an advertisement stored in portable storing means, and display means of producing a navigation display based on said navigational information acquired from said input means;

wherein the at least one of the program and the advertisement is displayed to a user before said navigational information is stored in said portable storing means.

13. A third system comprising:

input means of acquiring navigational information in relation to a program and/or an advertisement from portable storing means in which said navigational information is stored, via portable information processing means which acquires at least said navigational information, and display means of producing a navigation display based on said navigational information acquired from said input means;

wherein the at least one of the program and the advertisement is displayed to a user before said navigational information is acquired.

14. A third system comprising:

input means of acquiring an address of information storing means in which navigational information in relation to a program and/or an advertisement is stored, from a portable information processing means where said address is held, and display means of producing a navigation display by acquiring said navigational information by accessing said information storing means based on said address acquired from said input means;

wherein the at least one of the program and the advertisement is displayed to a user before said navigational information is acquired.

15. A navigation method comprising:

broadcasting step of broadcasting navigational information in relation to a program and/or an advertisement, in addition to at least one of the program and the advertisement;

the navigational information including navigation guidance to at least one travel destination;

broadcast receiving step of receiving said broadcast and transferring said navigational information contained in said received broadcast to a portable memory means for storing therein;

transferring said navigational information includes transferring the navigation guidance of the at least one travel destination to the portable memory means; and information receiving/transmitting step of producing a navigation display by acquiring said navigational information stored in said portable memory means;

and navigating to the at least one travel destination by acquiring the navigation guidance stored in said portable memory means;

wherein the at least one of the program and the advertisement is presented to a user before said navigational information is acquired.

16. A navigation method which uses a portable information processing means that can store at least navigational information in information storing means and can acquire at least said navigational information from said information storing means, said method comprising:

broadcasting step of broadcasting navigational information in relation to a program and/or an advertisement, in addition to at least one of the program and the advertisement;

the navigational information including navigation guidance to at least one travel destination;

broadcast receiving step of receiving said broadcast and outputting said navigational information contained in said received broadcast to said portable information processing means;

transferring said navigational information includes transferring the navigation guidance of the at least one travel destination to said portable information processing means;

information receiving/transmitting step of producing a navigation display by acquiring via said portable information processing means said navigational information that said portable information processing means stored in said information storing means;

and navigating to the at least one travel destination by acquiring the navigation guidance stored in said portable information processing means wherein the at least one of the program and the advertisement is presented to a user before said navigational information is acquired.

17. A navigation method which uses a portable information processing means that can store at least navigational information in information storing means and can output an address of said information storing means, said method comprising:

broadcasting step of broadcasting navigational information in relation to a program and/or an advertisement, in addition to at least one of the program and the advertisement;

the navigational information including navigation guidance to at least one travel destination;

broadcast receiving step of receiving said broadcast and outputting said navigational information contained in said received broadcast to said portable information processing means;

transferring said navigational information includes transferring the navigation guidance of the at least one travel destination to said portable information processing means; and information receiving/transmitting step of acquiring the address of said information storing means from said portable information processing means, and producing a navigation display by acquiring said navigational information by accessing said information storing means based on said address;

and navigating to the at least one travel destination by acquiring the navigation guidance stored in said portable information processing means;

wherein the at least one of the program and the advertisement is presented to a user before said navigational information is acquired.

18. A navigation method comprising:

broadcasting step of broadcasting navigational information in relation to a program and/or an advertisement, in addition to at least one of the program and the advertisement;

the navigational information including navigation guidance to at least one travel destination;

broadcast receiving step of receiving said broadcast and presenting said program and/or said advertisement to a user and, in response to a request from said user, requesting said broadcasting step to download said navigational information related to said program and/or said advertisement into an information storing means;

transferring said navigational information includes transferring the navigation guidance of the at least one travel destination to said information storing means; and information receiving/transmitting step of producing a navigation display by acquiring said navigational information that said broadcasting step downloaded into said information storing means in response to the request from said broadcast receiving step;

and navigating to the at least one travel destination by acquiring the navigation guidance stored in said information storing means;

wherein the at least one of the program and the advertisement is presented to a user before said navigational information is acquired.

* * * * *

UNITED STATES PATENT AND TRADEMARK OFFICE

CERTIFICATE OF CORRECTION

PATENT NO. : 7,809,499 B2
APPLICATION NO. : 11/734963
DATED : October 5, 2010
INVENTOR(S) : Hidetsugu Maekawa et al.

It is certified that error appears in the above-identified patent and that said Letters Patent is hereby corrected as shown below:

Cover Page
Between item (63) and item (51), enter field -- (30) Foreign Application Priority Data Nov. 8, 2000 (JP) 2000-340028 --.

Signed and Sealed this
Twenty-fifth Day of January, 2011

David J. Kappos

David J. Kappos
*Director of the United States Patent and Trademark Office*